(12) United States Patent
Groves et al.

(10) Patent No.: US 11,247,927 B1
(45) Date of Patent: Feb. 15, 2022

(54) WATER PURIFICATION SYSTEM

(71) Applicant: OLIMAX INC, Freeland, WA (US)

(72) Inventors: Oliver James Groves, Freeland, WA (US); Mark James Groves, Meridian, ID (US); Shad James Groves, Long Beach, CA (US)

( * ) Notice: Subject to any disclaimer, the term of this patent is extended or adjusted under 35 U.S.C. 154(b) by 0 days.

(21) Appl. No.: 17/308,505

(22) Filed: May 5, 2021

(51) Int. Cl.
| | |
|---|---|
| C02F 9/00 | (2006.01) |
| C02F 1/32 | (2006.01) |
| C02F 1/42 | (2006.01) |
| C02F 1/14 | (2006.01) |
| C02F 1/04 | (2006.01) |
| C02F 1/00 | (2006.01) |

(52) U.S. Cl.
CPC ............. *C02F 9/00* (2013.01); *C02F 1/001* (2013.01); *C02F 1/046* (2013.01); *C02F 1/14* (2013.01); *C02F 1/32* (2013.01); *C02F 1/42* (2013.01); *C02F 1/006* (2013.01); *C02F 2001/422* (2013.01); *C02F 2001/425* (2013.01); *C02F 2201/005* (2013.01); *C02F 2209/02* (2013.01); *C02F 2209/03* (2013.01); *C02F 2209/06* (2013.01); *C02F 2301/063* (2013.01)

(58) Field of Classification Search
None
See application file for complete search history.

(56) References Cited

U.S. PATENT DOCUMENTS

2012/0181238 A1* 7/2012 Sussman .............. B01D 61/147
210/790

* cited by examiner

*Primary Examiner* — Chester T Barry
(74) *Attorney, Agent, or Firm* — Michael D. Eisenberg

(57) ABSTRACT

A water purification system comprising a salvage pump, a vacuum assembly, and a clean water assembly. The salvage pump is configured to draw water from a water source. The vacuum assembly is configured to remove solutes from the water via vacuum evaporation. The clean water assembly is configured to remove non-soluble particles and/or bacteria from the water.

20 Claims, 14 Drawing Sheets

WATER PURIFICATION SYSTEM

TECHNICAL FIELD

The present application, in some embodiments thereof, relates to water purification systems for converting contaminated water to potable water.

BACKGROUND

The need for clean energy and water availability has always been an environmental issue throughout the world. Contaminated water is especially a problem, since it is not suitable for basic human uses such as drinking, bathing, and preparing food. Therefore, there exists a need for an efficient, low-energy water system requiring a minimal amount of maintenance.

BRIEF SUMMARY OF THE INVENTION

An aim of the system of the present invention is to provide a water purification system that uses low-yield and can yield potable water from contaminated water sources.

Another aim of the present invention is to provide a compact water purification and/or desalination system configured for a family home or shared with a neighborhood community or in locations where only sea water or contaminated water is available.

Therefore, an aspect of some embodiments of the present invention relates to a water purification system comprising a salvage pump, a vacuum assembly, and a clean water assembly. The salvage pump, is configured to draw water from a water source. The vacuum assembly includes a vacuum tank, a vacuum pump assembly, an atmospheric tank, a heat exchanger pipe, and a first pump. The clean water assembly includes a plurality of filters, a clean tank, a second pump, and a third pump. The vacuum tank is configured to receive water from the salvage pump. The vacuum pump assembly is configured to lower pressure inside the vacuum tank to cause evaporation of water stored in the vacuum tank, and to draw water vapor from the vacuum tank. The atmospheric tank is configured to be maintained at an atmospheric pressure and to receive the water vapor drawn by the vacuum pump assembly from the vacuum tank, the atmospheric tank being configured to transform water vapor received from the vacuum pump into liquid water. The heat exchanger pipe traverses the atmospheric water tank and is configured to lead water from the salvage pump to the vacuum tank without contacting the water and water vapor in the atmospheric tank, thereby warming the water in the heat exchanger pipe while cooling the water and water vapor inside the atmospheric tank. The first pump is configured to draw water out of the atmospheric tank. The plurality of filters is configured to filter water drawn by the first pump. The clean tank is configured to receive water that has been filtered by the plurality of filters. The second pump is configured for drawing water from the clean tank to a water storage tank. The third pump is configured for drawing water from the clean tank and leading the water drawn from the clean tank into a further purification cycle.

In a variant, the vacuum pump assembly comprises a low-yield vacuum pump and at least one high-yield vacuum pump. The low-yield vacuum pump is configured to lower pressure inside the vacuum tank to a first predetermined pressure and configured to have an exhaust outside the atmospheric tank. The at least one high-yield vacuum pump is configured to be activated after the low-yield vacuum tank, and configured to lower pressure inside the vacuum tank from the first predetermined pressure to a second predetermined pressure lower than the first predetermined pressure, the at least one high-yield pump exhausting into the atmospheric tank. An operation of the at least one high-yield vacuum pump after the low-yield vacuum has brought pressure inside the vacuum tank to the predetermined first pressure is configured to diminish an occurrence of liquid water being pumped from the vacuum tank to the atmospheric tank by the high-yield vacuum pump.

Optionally, the first predetermined pressure is at or above 982 mbars, and the second predetermined pressure is about 939.7 mbars.

In another variant, the water purification system further comprises a solar pump and a solar water collector. The solar pump is configured to drive water from an outlet of vacuum tank to an inlet of the solar collector, via the solar collector, via an outlet of the solar collector, and back into the vacuum tank via an inlet of the vacuum tank. The solar collector is configured for using solar power to heat water flowing in the solar collector.

In yet another variant, the vacuum assembly comprises a brine tank located under the vacuum tank and communicating with the vacuum tank via a first water line opened and closed via a top valve. When the top valve is opened, brine collected at a bottom of the vacuum tank enters the brine tank.

In a further variant, the vacuum assembly comprises a waste tray located under an outlet of the brine tank. The outlet of the brine tank is configured to be opened and closed via a bottom valve. When the bottom valve is opened, the brine collected in the brine tank enters the waste tray.

The waste tray my be removable from under the outlet of the brine tank.

In yet a further variant, the water purification system further comprises a fluoride water filter located downstream of the second pump.

In some embodiments of the present invention, the clean water assembly comprises a manifold, at least one ion exchange tank, a carbon tank, a cation tank, and an anion tank. The manifold comprises an inlet for receiving water from the first pump, a first exit line, a second exit line, and a third exit line, each exit line being openable and closable by a respective valve. The first exit line leads to the least one ion exchange tank. The at least one ion exchange tank has an outlet leading to the carbon tank, which has a first outlet leading to the clean tank. The second exit line leads to the cation tank, which has a second outlet leading to the clean tank. The third exit line leads to the anion tank, which has a third outlet leading to the clean tank. The at least one ion exchange tank and the carbon tank are configured to balance the pH of water flowing therethrough. The cation tank contains $H^+$ ions, and is configured to decrease a basicity of water flowing therethrough by neutralizing excess $OH^-$ ions in the water with the $H^+$ ions in the cation tank. The anion tank contains $OH^-$ ions, and is configured to decrease an acidity of water flowing therethrough by neutralizing excess $H^+$ ions in the water with the OH— ions in the anion tank.

The water purification system may comprise an initial filter located upstream of the manifold and configured for retaining particles larger than a first predetermined size.

The water purification system may comprise a second filter located between the carbon tank and the clean tank, and is configured for retaining particles larger than a second predetermined size.

The water purification system may comprise an ultra violet (UV) treatment device located upstream of the manifold and configured to expose water to UV light to kill bacteria in the water.

In a variant, the third pump is configured to draw water from the clean tank and deliver the water to a first return water line and to a second return water line. The first return water line leads water drawn by the third pump back to the plurality of filters. The second return water line leads water drawn by the third pump back to the vacuum tank. A first return valve is located along the first return water line to enable the first return water line to be opened and closed. A second return valve is located along the second return water line to enable the second return water line to be opened and closed.

In another variant, the water purification system comprises a water flow meter installed along any water line of the system to monitor an amount of water used in the system.

In yet another variant, the vacuum tank comprises a first temperature gauge and a heating element. The first temperature gauge is configured to measure temperature of the water in the vacuum tank and for activating the heating element so as to maintain the water in the hot water tank above a desired temperature or within a desired range of temperatures.

In a further variant, the at least one high-yield vacuum pump comprises a plurality of high-yield vacuum pumps in parallel with each other.

In yet a further variant, the water purification system, further comprises a shroud and a fan. The shroud has a wall surrounding the atmospheric tank, the wall having an opening. The fan is configured to direct air from outside the shroud into the shroud, to contact an external wall of the atmospheric tank to cool the atmospheric tank.

In a variant, the water purification system further comprises a skirting tube which skirts around the outer wall of the atmospheric tank, the skirting tube receiving the source water from the salvage pump and directing the water into the heat exchange pipe, such that the source water inside the skirting tube exchanges heat with the outer wall of the atmospheric tank, and the source water inside the skirting tube is cooled by the air driven by the fan.

In another variant, the water purification system comprises a dome and a shroud floor. The dome is located above the shroud wall. The shroud floor is configured to support the atmospheric tank, and having a skirt extending upwards from the shroud floor and surrounding the atmospheric tank. Some of the moisture in the air directed by the fan evaporates into water vapor upon contacting the outer wall of the atmospheric tank, and the dome is configured to cause the water vapor to condensate, drip as liquid water on the shroud floor, and collect on the shroud floor between the skirt and the atmospheric tank.

The water purification system may comprise a water line connected to the first pump and configured to direct the liquid water collected on the shroud floor to the clean water assembly.

Figure 1:
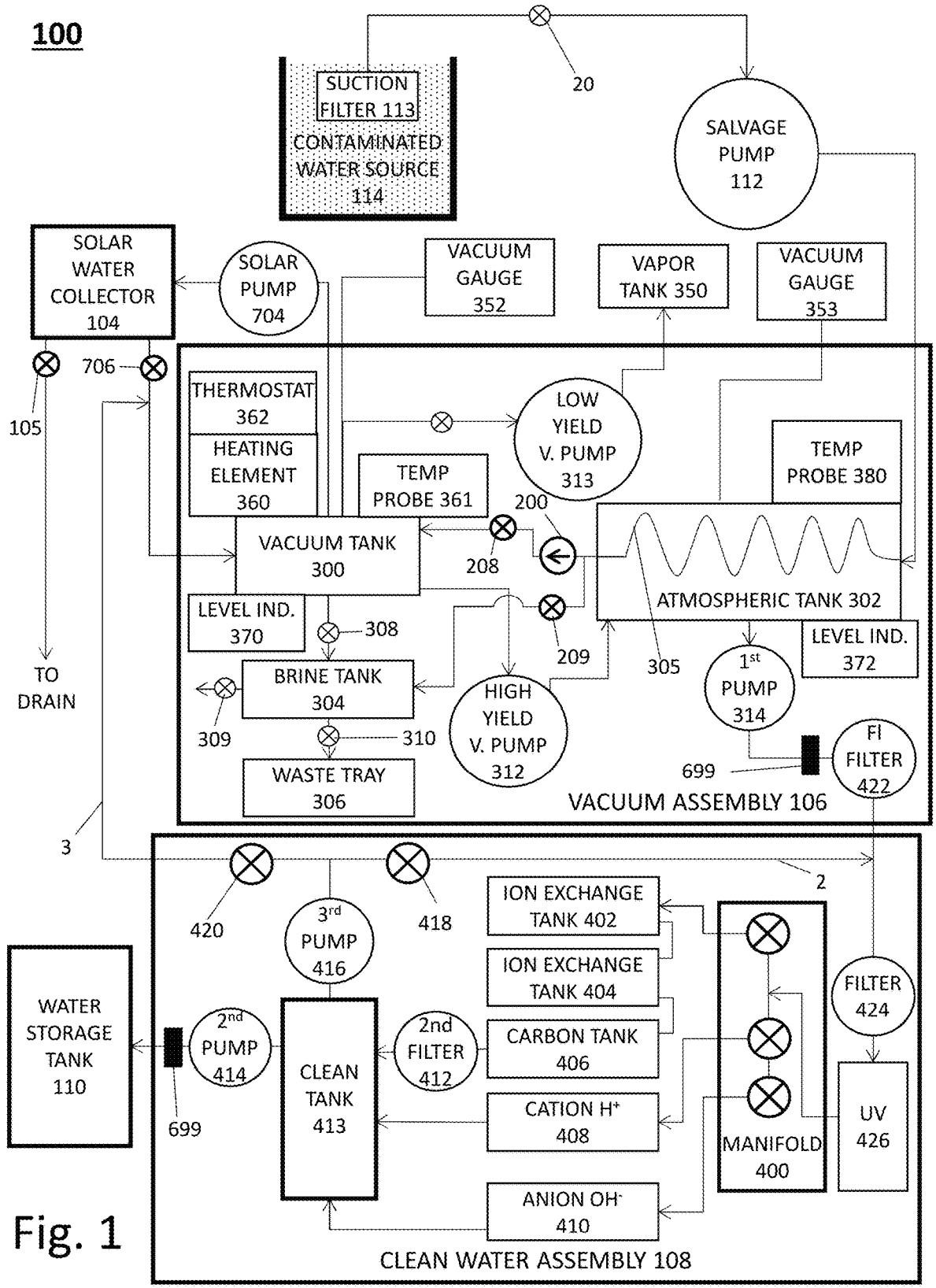
FIG. 1 is a block diagram showing a water purification system, according to some embodiments of the present invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Referring now to FIGS. 1-10 and 14, a water purification system 100 includes a salvage pump 112, vacuum assembly 106, and a clean water assembly 108 configured to be connected to a water storage tank 110. Optionally, the water storage tank 110 is part of the system 100 as well. Optionally, the system also includes a solar collector 104. The vacuum assembly 106 is configured to remove soluble contaminants (such as salt, for example) from the source water. The clean water assembly 108 is configured to remove non-soluble contaminants (such as bacteria, viruses, for example) from the water that was partially purified by the vacuum assembly 106, and to regulate the pH of the water.

The salvage pump 112 draws water from a contaminated water source 114. In some embodiments of the present invention, a suction filter 113 (such as a 10 micron inline filter, for example) is located below the water surface upstream of the salvage pump 112 and is configured for preventing particles in the water source that are larger than a predetermined size (e.g., 10 microns) from entering the system 100. A ball valve 20 may be placed upstream of the salve pump 112 to control flow of water into the system.

The vacuum assembly 106 includes a vacuum tank 300, an atmospheric tank 302, a brine tank 304, and a waste tray 306. The atmospheric tank 302 includes a heat exchange pipe 305 passing therethrough. The source water pumped from the contaminated water source is directed by the salvage pump 112 into the heat exchange pipe 305, where the source water is heated by absorbing heat of the water and/or water vapor in the atmospheric tank 302, thereby cooling the water and/or water vapor in the atmospheric tank 302.

The source water that has passed through the heat exchange pipe 305 enters the vacuum tank 300. Piping lines going from the atmospheric tank 302 to the vacuum tank 300 may be insulated, to retain the heat absorbed in the exchange pipe 305. Once the water in the vacuum tank 300 reaches a predetermined control level (determined via a first level indicator 370) and is optionally at or above a predetermined temperature level (e.g., 108 degrees Fahrenheit) (measured via a first temperature probe 361), the salvage pump 112 remains on and the water flow into the vacuum tank 300 is regulated by adjusting by the flow control valve 200 (located before entry to the vacuum tank 300) which is set at a desired flow rate (for example 9.8 oz per minute) while the water flows into the vacuum tank 300.

At this point, a first valve 208 in the piping leading from the exchange pipe 305 to the vacuum tank 300 is open, and a vacuum pump assembly connected to the vacuum tank 300 is configured to be activated in order to lower the air pressure in the vacuum tank 300 (thereby increasing vacuum pressure), so that water in the vacuum tank evaporates at a lower temperature than standard conditions (e.g. atmospheric pressure).

The vacuum pump assembly includes at least one low-yield vacuum pump 313 (for example, a rotary vane vacuum pump) and at least one high-yield vacuum pump 312 (for example, a CP-150 Claw vacuum pump). The low-yield vacuum pump 313 is operated first and is configured for slowly removing air from the vacuum tank, until a first air pressure (a rough vacuum) is reached inside the vacuum tank 300. The air and vapor removed by the low-yield vacuum tank is released to the atmosphere or into a vapor tank 350.

Then, the high-yield vacuum pump 312 is turned on, in order to further decrease the air pressure inside the vacuum tank 300, until a desired air pressure (and a desired vacuum pressure) is reached (e.g., vacuum pressure of 29 inHg/982 mbars). The desired air pressure in the vacuum tank 300 reached via the operation of the high-yield vacuum pump 312 is lower than the first air pressure in the vacuum tank reached via the operation of the low-yield vacuum pump 313. Thus, the desired vacuum pressure in the vacuum tank 300 reached via the operation of the high-yield vacuum pump 312 is higher than the first vacuum pressure in the vacuum tank reached via the operation of the low-yield vacuum pump 313. In a non-limiting example, the low-yield vacuum pump 313 is configured to decrease the air pressure inside the vacuum tank to a pressure between 982 and 1014.5 mbars. The high-yield vacuum pump 312 is configured to decrease the air pressure inside the vacuum tank to 50-1000 mbars, for example about 27.75 inHg or 939.7 mbars, and maintain the pressure in the vacuum tank at the desired pressure below 1000 mbars.

This lowers the air pressure in the vacuum tank 300 (thereby increasing vacuum pressure), so that water evaporates at a lower temperature than standard conditions (e.g. atmospheric pressure). The high-yield vacuum pump 312 pumps the water vapor in the vacuum tank 300 to the atmospheric tank 302 (to the area outside the heat exchange pipe 305).

Figure 4:
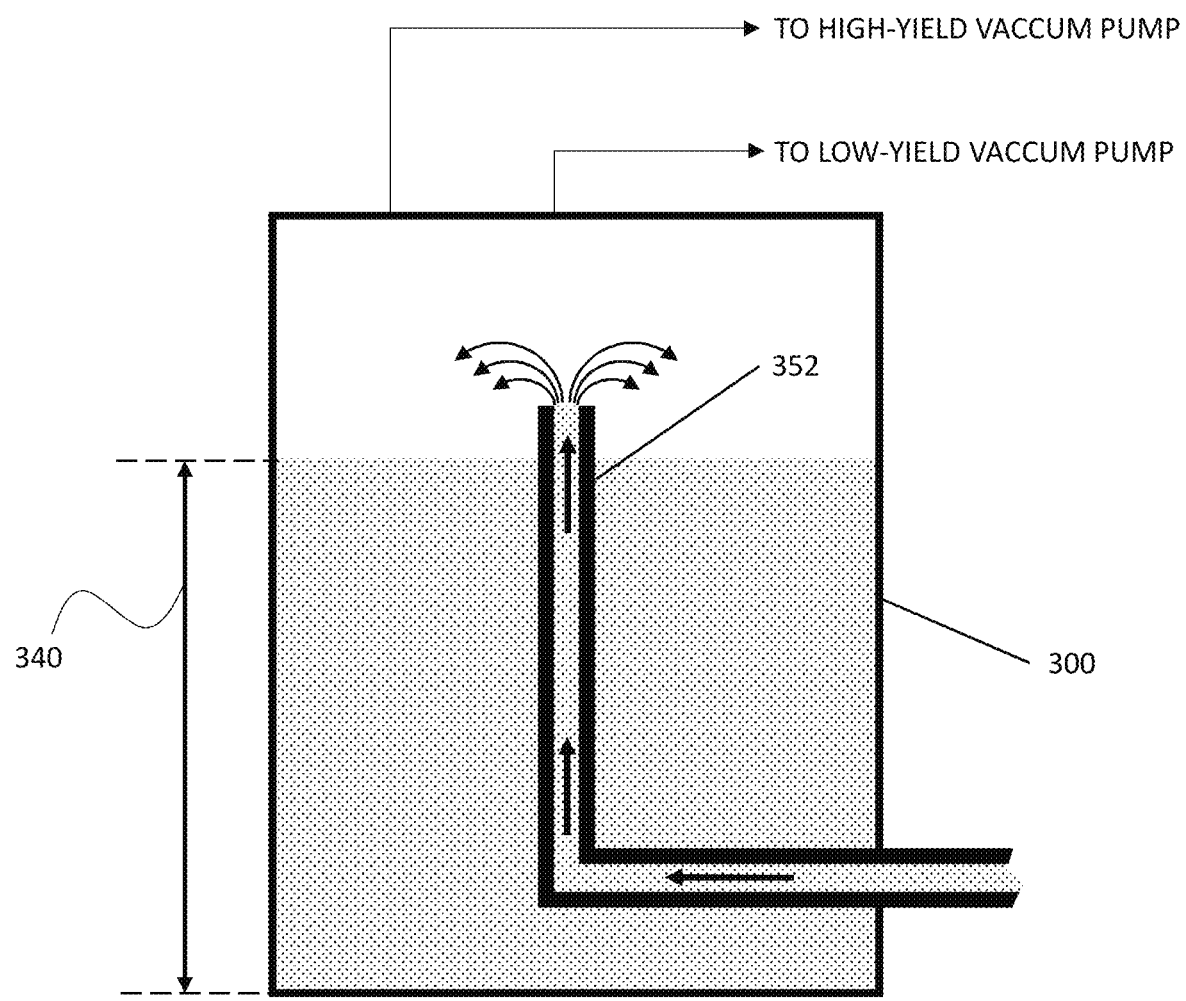
FIG. 4 illustrates an example of the release of source water inside the vacuum tank, according to some embodiments of the present invention.
Figure 5:
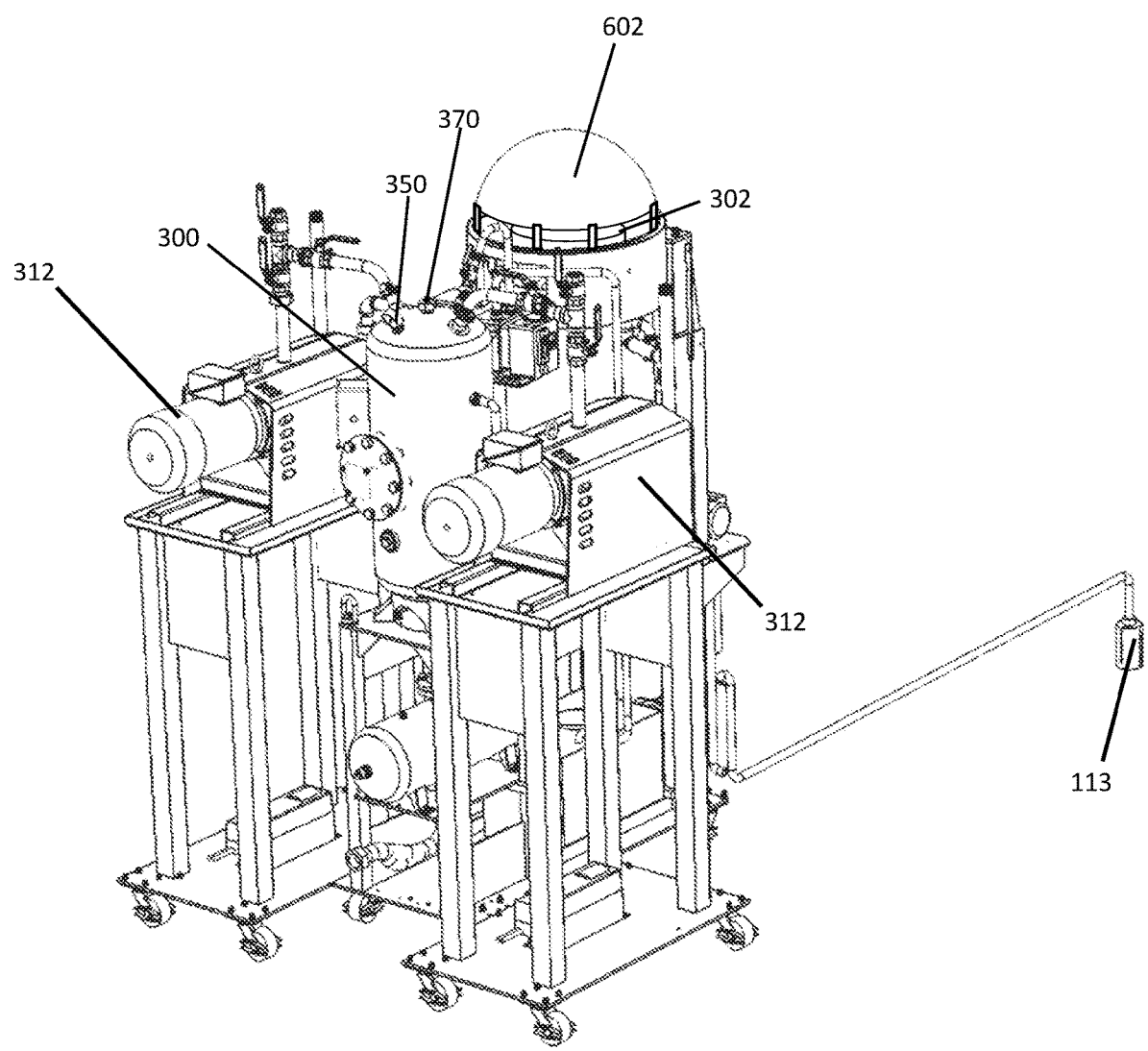
FIGS. 5-9 are perspective views illustrating an example of the vacuum assembly of the water purification system of FIG. 1, according to some embodiments of the present invention.
Figure 6:
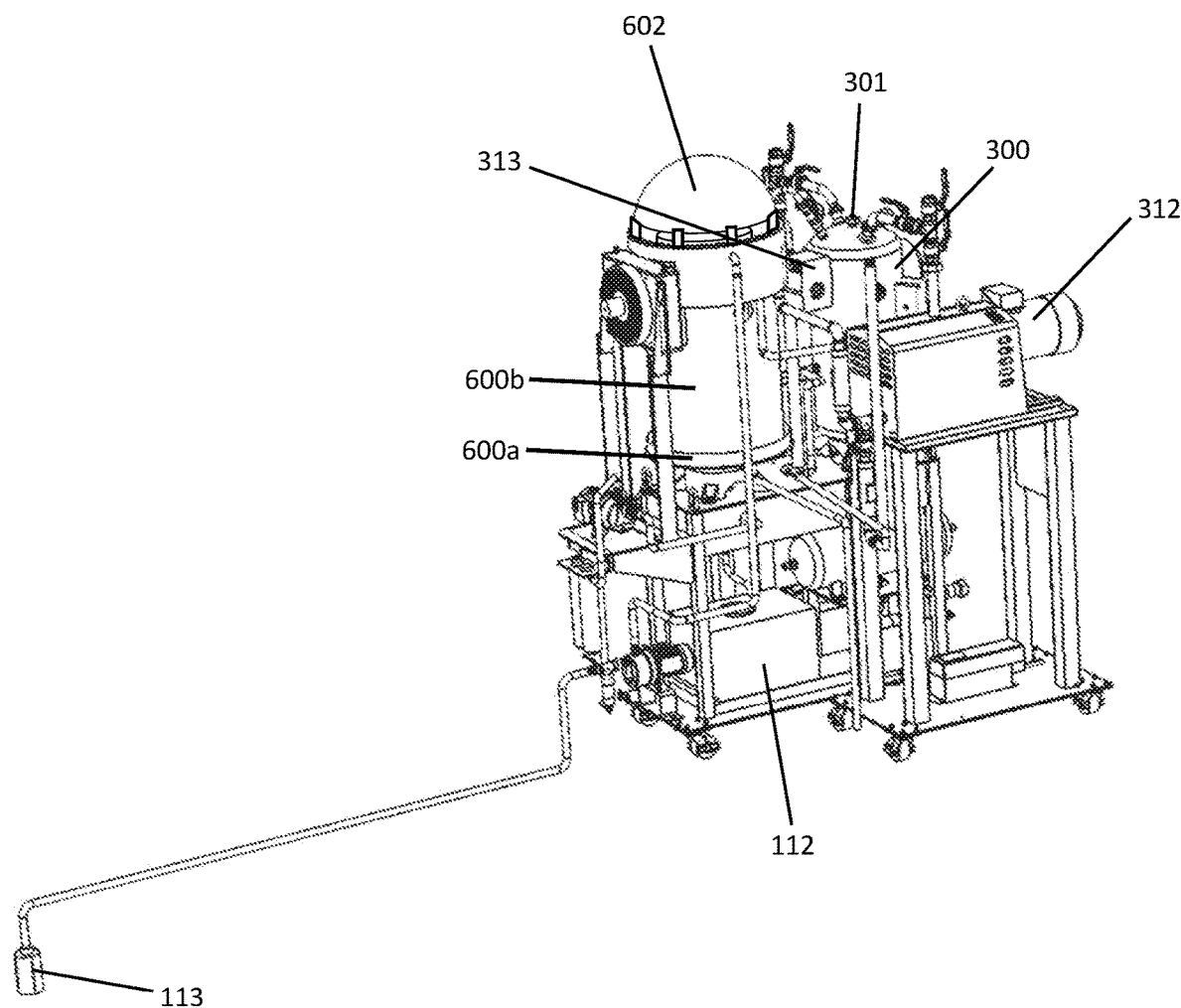
Figure 7:
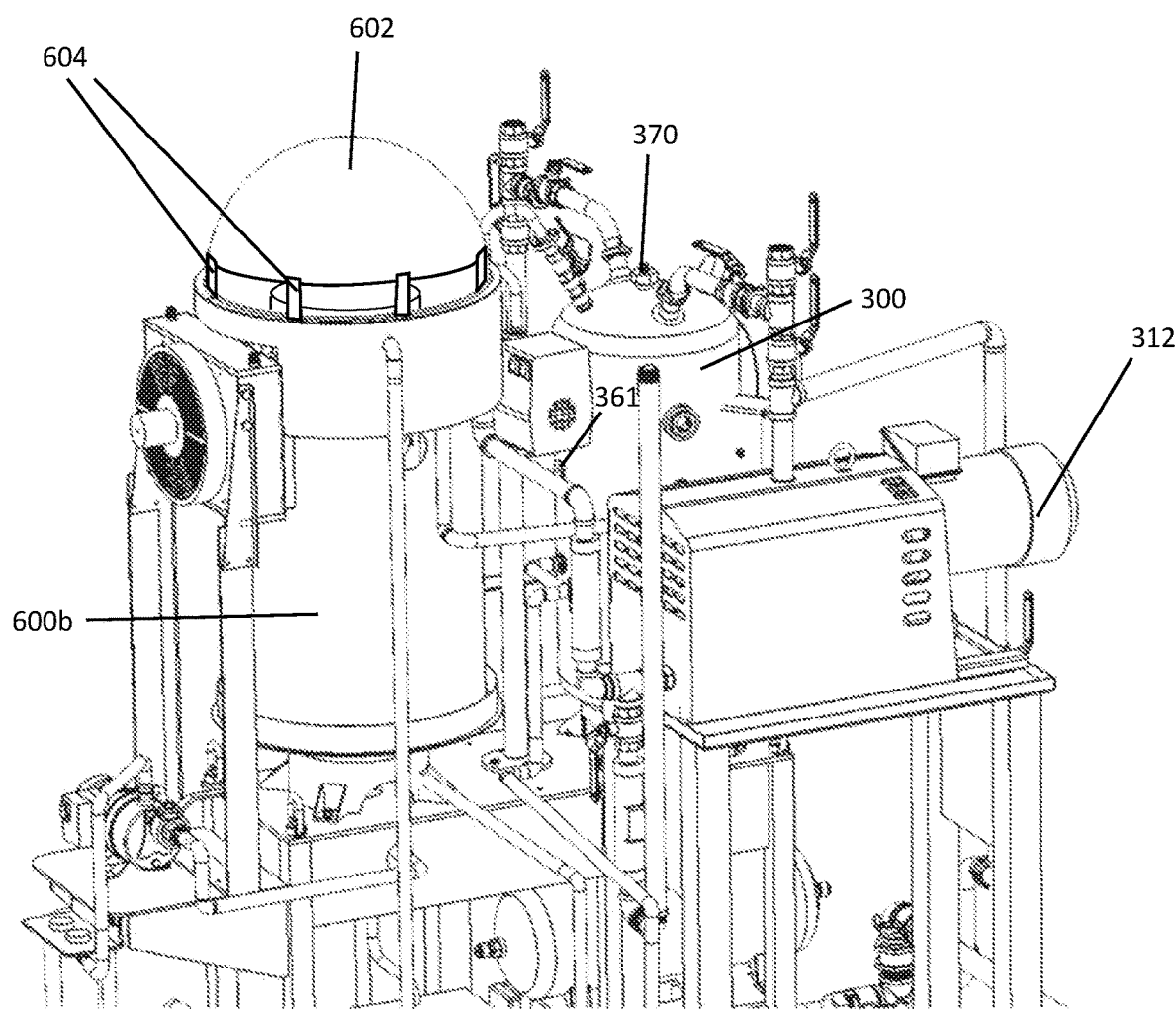
Figure 8:
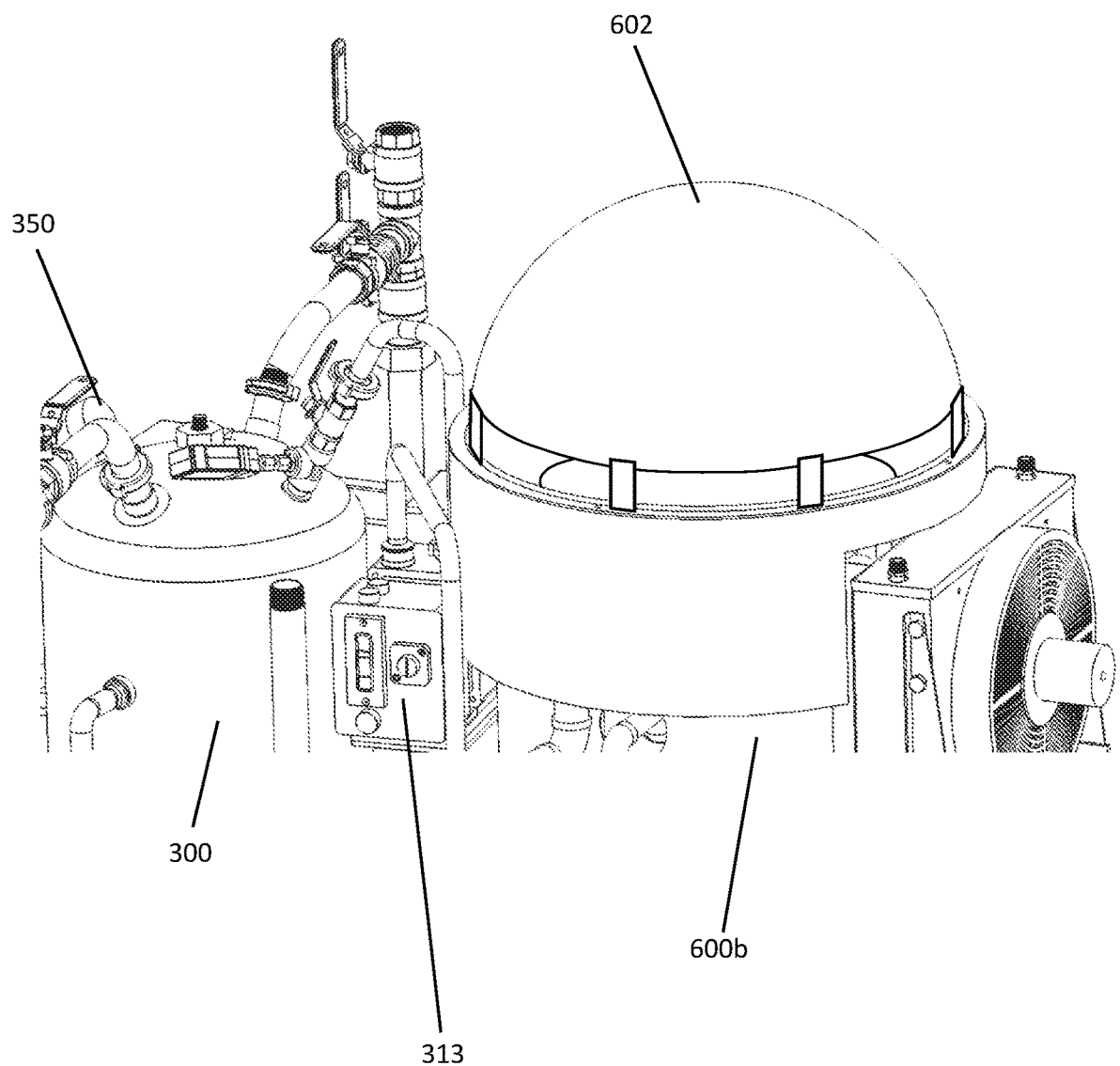
Figure 9:
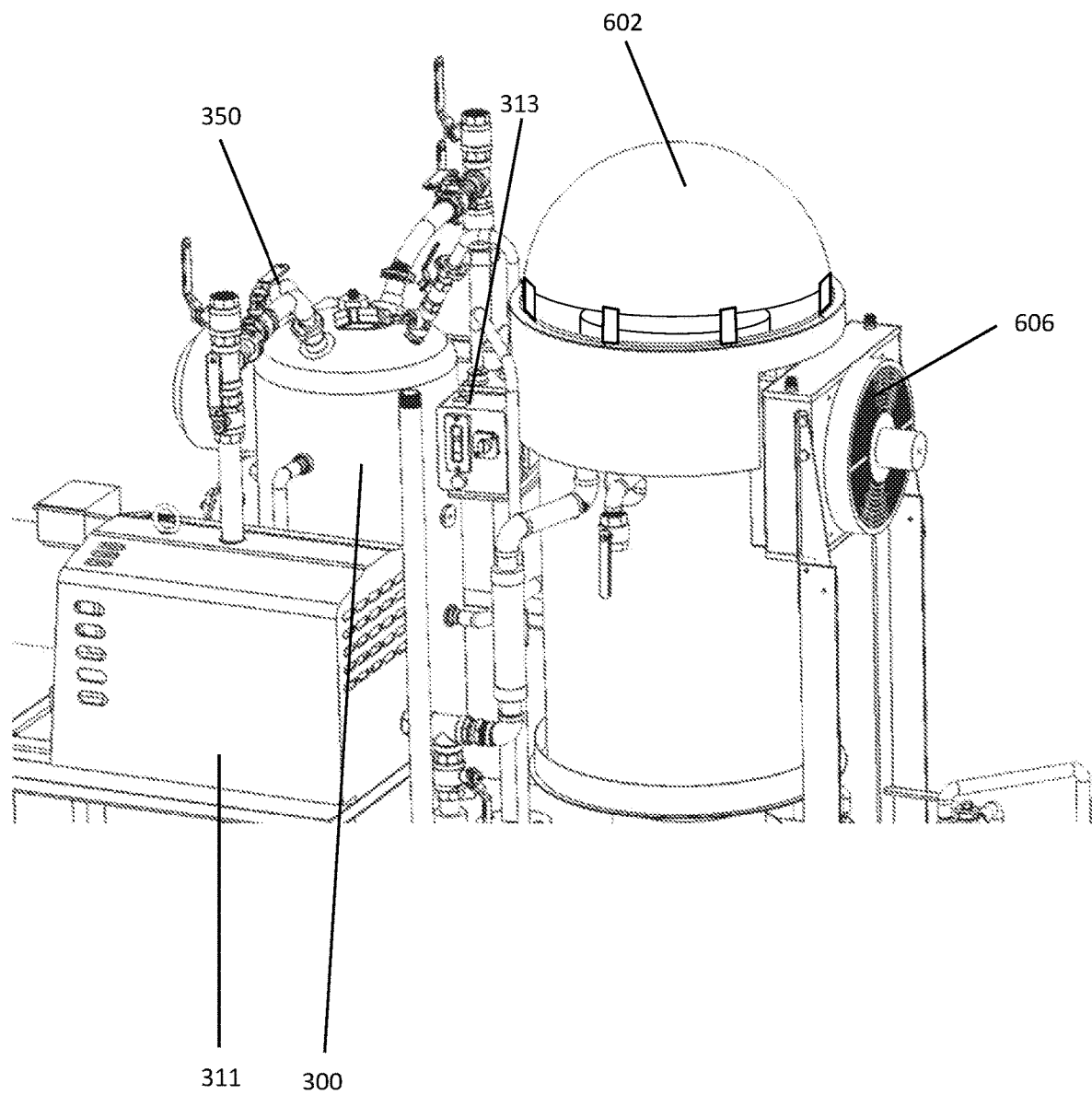

In some embodiments of the present invention, the output pipes from the vacuum tank 300 leading into the high-yield vacuum pump 312 and into the low-yield vacuum pump 313 are located above a predetermined maximal water level of the vacuum tank 300, as shown in the example of FIG. 4. In this manner, the risk of liquid water being pumped out of the vacuum tank 300 by the high-yield vacuum pump 312 or the low-yield vacuum pump 313 is reduced or eliminated.

The high-yield vacuum pump 312 may be a Leybold CP-150 CLAWVAC pump models CP-65, CP-150 AND CP-300, or a Leybold Screwline SP250 Dry vacuum pump P/N 115001 which provides 330 m$^3$ per hr. 194CFM W/60 Hz at 10 microns or $1\times10^{-2}$ Torr. A Tuthill dry vacuum pump, such as a dry screw vacuum pump, models SDV-120 & SDV-200 may be used instead, with a Tuthill motor mounted single stage liquid ring vacuum pump A100 thru A300 models. In some embodiments of the present invention, the minimum basic requirement for the high-yield vacuum pump is having a vacuum pressure in the vacuum tank capable of reaching 50 mbars or 1.476 inHg and a pumping speed of 150/180 m$^3$/h or a volume of 106.9/167.25 cfm, with these requirements along with a predetermined temperature of 104 to 212 degrees Fahrenheit for allowing water vapor to be achieved.

The low-yield vacuum pump 313 is used to remove gases from the vacuum tank, and may be, for example, an Alcatel-Adixen rotary vane vacuum pump, Model number 2005SD. Level of vacuum, high vacuum 1 micron (1 Torr-10-3 Torr), 3.8 cfm, inlet/outlet exhaust NW25/NW25, Motor ½ HP. There are several other rotary vane vacuum pumps available on the market today with different cfm and horsepower.

As explained above, lowering the air pressure (increasing vacuum pressure) in the vacuum tank 300 occurs in two stages: first, by using a low-yield vacuum pump first 313, and second, by using a high-yield vacuum pump 312. The advantage of this two-stage lies in the fact that using a high-yield vacuum pump alone would not allow enough time for liquid water in the vacuum tank to evaporate before being sucked out of the vacuum tank. This would cause liquid water to be brought from the vacuum tank into the atmospheric tank. Using a low-yield vacuum pump first slowly lowers the air pressure in the vacuum tank and exhausts air and vapor into the atmosphere or into a vapor tank 350, giving enough time for the water to evaporate in the vacuum tank, before lowering the pressure even further and pumping water vapor into the atmospheric tank.

As the vacuum pressure in the vacuum tank 300 is increased (air pressure is decreased), and the temperature of the water brought into the vacuum tank is increased from its original temperature, the surface water in the vacuum tank 300 (along with any oils, if present) evaporates and is thereby separated from the salts and contaminants dissolved therein, to form brine (e.g., a mixture water and salt in which the salt is at least 26% of the mixture) inside the vacuum tank 300. The high-yield vacuum pump 312 pumps the water vapor and oil vapor from the vacuum tank 300 to the atmospheric tank 302, which is kept at atmospheric pressure, while the brine which includes at least 26% salt in water solution (salt NaCl having a density of 145 lbs/ft$^3$ as opposed to water density of 62.4 lbs/ft$^3$) is directed by gravity to the brine tank 304. The brine tank 304 is located under the vacuum tank 300 and is connected to the vacuum tank 300 via a pipe with a top (ball) valve 308.

The vacuum tank 300 includes a temperature probe 361 (for example, a stainless steel thermocouple sensor) configured to measure the temperature of the water in the vacuum tank. In some embodiments of the present invention, if the water in the vacuum tank has not reached the predetermined temperature level, the water is heated, by activating a secondary heating element 360 and/or by activating the solar water pump 704 which directs the water to a solar water collector 104, where the water is heated by using solar energy/power and returned to the vacuum tank 304.

Figure 15:
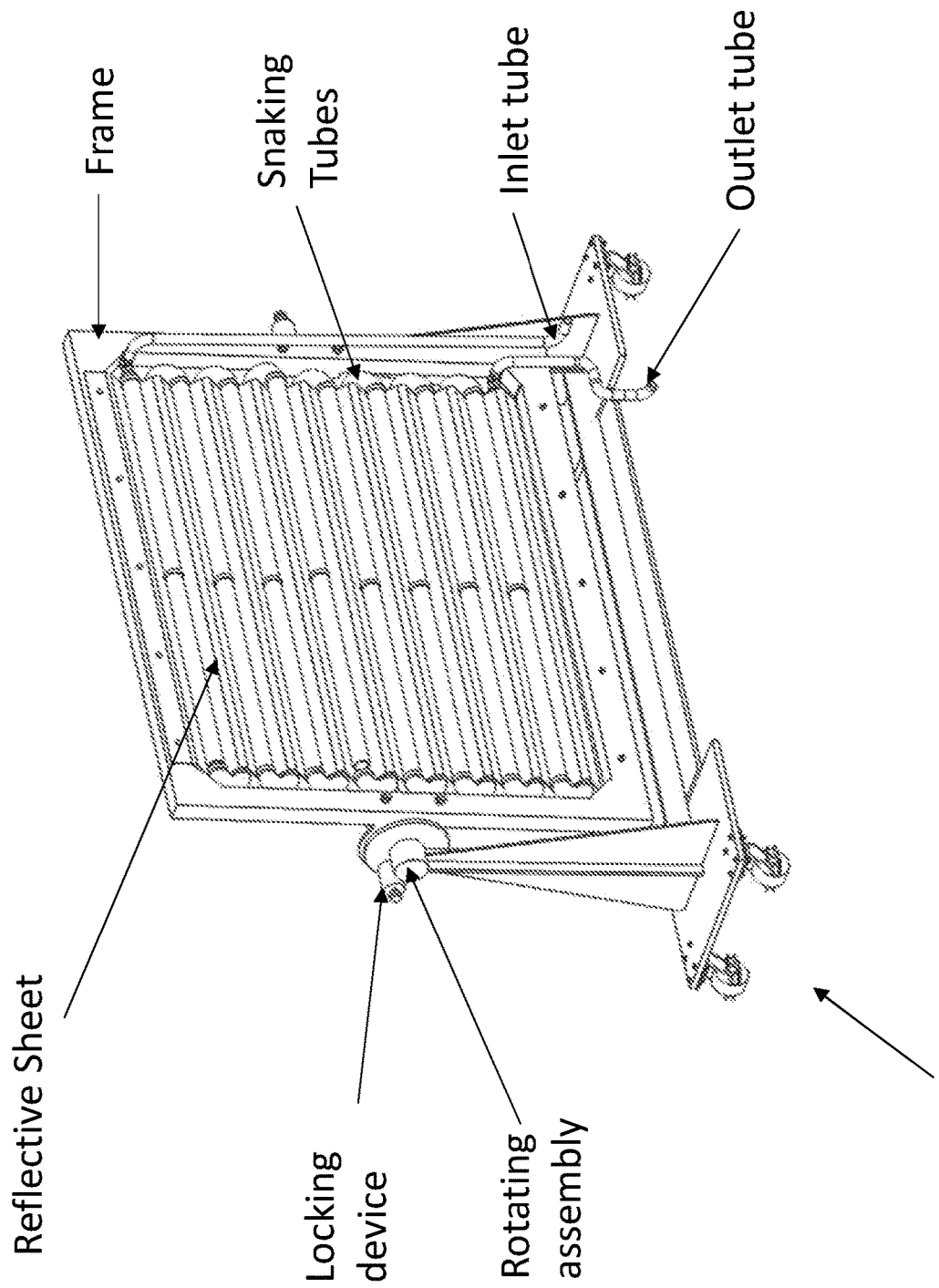
FIG. 15 is an isometric drawing of an example solar water collector used in conjunction with or as part of the water purification system of the present invention.

In some embodiments of the present invention, as shown in FIG. 15, the solar water collector 104 includes an inlet tube, an outlet tube, a snaking tube, and a reflective sheet. Water from the vacuum tank is received by the inlet tube, led to the snaking tube, and led to the outlet tube back into the vacuum tank. The snaking tube may be a corrugated sheet (e.g. a 5052 aluminum sheet) having a plurality of corrugations which receive elongated portions of the snaking tube and reflect sunlight onto the snaking tube to heat the water within the snaking tube. The snaking tube may be a copper tube. The solar water collector may be rotatable, to increase the exposure of the reflective sheet to the sun. For this purpose, the solar water collector 104 may have a rotating assembly and a locking device. The rotating assembly is configured to rotate the reflective sheet and snaking tube to a desired orientation, while the locking device is configured to lock the reflective sheet and snaking tube at the desired orientation. The inlet tube and the outlet tube may be flexible to enable the rotation of the snaking tube and reflective sheet without braking. It should be appreciated that the solar water collector of FIG. 15 is merely an example. Any other type of solar water collector may be used in conjunction or as part of the water purification system of the present invention.

The temperature of the water is verified through the probe 361, which includes a temperature sensor readout instrument. In some embodiments of the present invention, the solar water collector 104 has a drain outlet closed by a drain valve 105. The drain valve 105 is closed during the use of the system 100 and may be opened to drain the solar water collector 104 when the system 100 is not in use. In some embodiments of the present invention, a ball valve 706 is located at the outlet of the solar water collector and is configured to be closed to prevent water from the clean water tank from entering the solar water collector 104. In some embodiments of the present invention, the vacuum tank 300 includes a thermostat controller 362 connected to the temperature probe 361 and to the secondary heating element 360 and/or the solar water pump 704. The thermostat controller 362 is configured to receive a desired temperature from the user and to activate the secondary heating element 360 and/or the solar water pump 704, in order to increase the temperature in the vacuum tank to the desired temperature.

In some embodiments of the present invention, the vacuum tank 300 includes vertical tubing 352 located inside the vacuum tank and protruding above the maximal level of water 340 allowed in the vacuum tank as shown in FIG. 4.

In some embodiments of the present invention, the vacuum tank 300 includes vertical tubing 352 located inside the vacuum tank and protruding above the maximal level of water 340 allowed in the vacuum tank as shown in FIG. 4. Raw water directed into the vacuum tank 300 from the exchange pipe 305 enters the vertical tubing 352 and is directed above the maximal water level 340 of the water in the vacuum tank 300. In this manner the raw water is launched upwards from the outlet of the vertical tubing 352 and lands on the surface of the water in the vacuum tank, and thereby breaks up the tension created on the surface of the water. This facilitates the evaporation of the water in the vacuum tank 300 when the temperature is raised and the pressure is lowered.

The secondary heating element 360 may be connected to the inspection cover and controlled by setting by the thermostat located next to the heating element mounted to the side of the vacuum tank and set at a predetermined temperature (e.g., 125 degrees Fahrenheit) and is configured for heating water that has remained in the vacuum tank after the system has been shut down and needs to be heated back up again, and/or it is used to heat water entering the vacuum tank 300 from the heat exchange pipe 305 when no vapor has yet been transferred from the vacuum tank 300 to the atmospheric tank 302 to exchange heat with the water in the heat exchange pipe 305. Also, when there is not enough sunlight to heat the water in the solar water collector 104 to the desired temperature, it may be difficult to maintain heat in the vacuum tank 300 without some type of heater to maintain the desired temperature (e.g., 108/212 degrees Fahrenheit, based on the vacuum pressure), until the system 100 is up and running. When the high-yield vacuum pump 312 has been running for some time (for example, ten minutes), water vapor heats up to approximately 254 degrees Fahrenheit and is then transferred via the high-yield vacuum pump 312 to the atmospheric tank 302. Water passing in the heat exchange pipe 305 is therefore heated via heat exchange with the water/vapor inside the atmospheric tank 302. In this manner, water arriving to the vacuum tank is already preheated via the heat exchange with the water/vapor, and optionally by the solar water collector 104. The secondary heating element 360 is configured to assist the heating of the water by heat exchange and optionally via the solar water collector 104, if needed. When the temperature of water inside the vacuum tank is at the desired temperature (as measured by the temperature probe 361), the secondary heating element 360 is turned off by the temperature probe 361.

The secondary heating element 360 and the temperature (thermocouple) sensor/probe 361 may be powered by direct current (DC) or alternating current (AC). The heating element secondary 360 may be a resistive heating element, generating heat due to resistance offered to electrical current passing there though.

Both the vacuum tank 300 and the atmospheric tank 302 have respective (dual) level indicators 370 and 372 configured to measure the water level inside the respective tanks. The indicators 370 and 372 may be dual level float instruments with output panel meters (which may be digital, for example), that are designed notify the operator when the tanks are full of water or require additional water. The notification may be for example, via lights that may turn or off, depending on the water level. As noted above, the vacuum tank 300 includes a temperature probe 361 configured to measure the temperature of water in the vacuum tank 300 and display the measured temperature, for example via a digital readout panel. Similarly, the atmospheric tank 302 may have a temperature probe 380 configured to measure the temperature of water in the atmospheric tank 302 and display the measured temperature, for example via a digital readout panel.

After a period of cycles, the brine tank 304 is filled. The top valve 308 leading to the brine tank 304 is closed and bottom valve 310 leading out of the brine tank is opened to allow the brine to be discharged into the waste tray 306 located below the brine tank. The waste tray 306 may be removed. The waste tray is open to the outside environment, enabling the brine to be dried, leaving valuable by-product, such as sodium chloride and/or other contaminants. The dry waste product can be packaged and delivered to other facilities. If the dry waste product includes sodium chloride, any unneeded material may be removed from the sodium chloride in other facilities.

Figure 3:
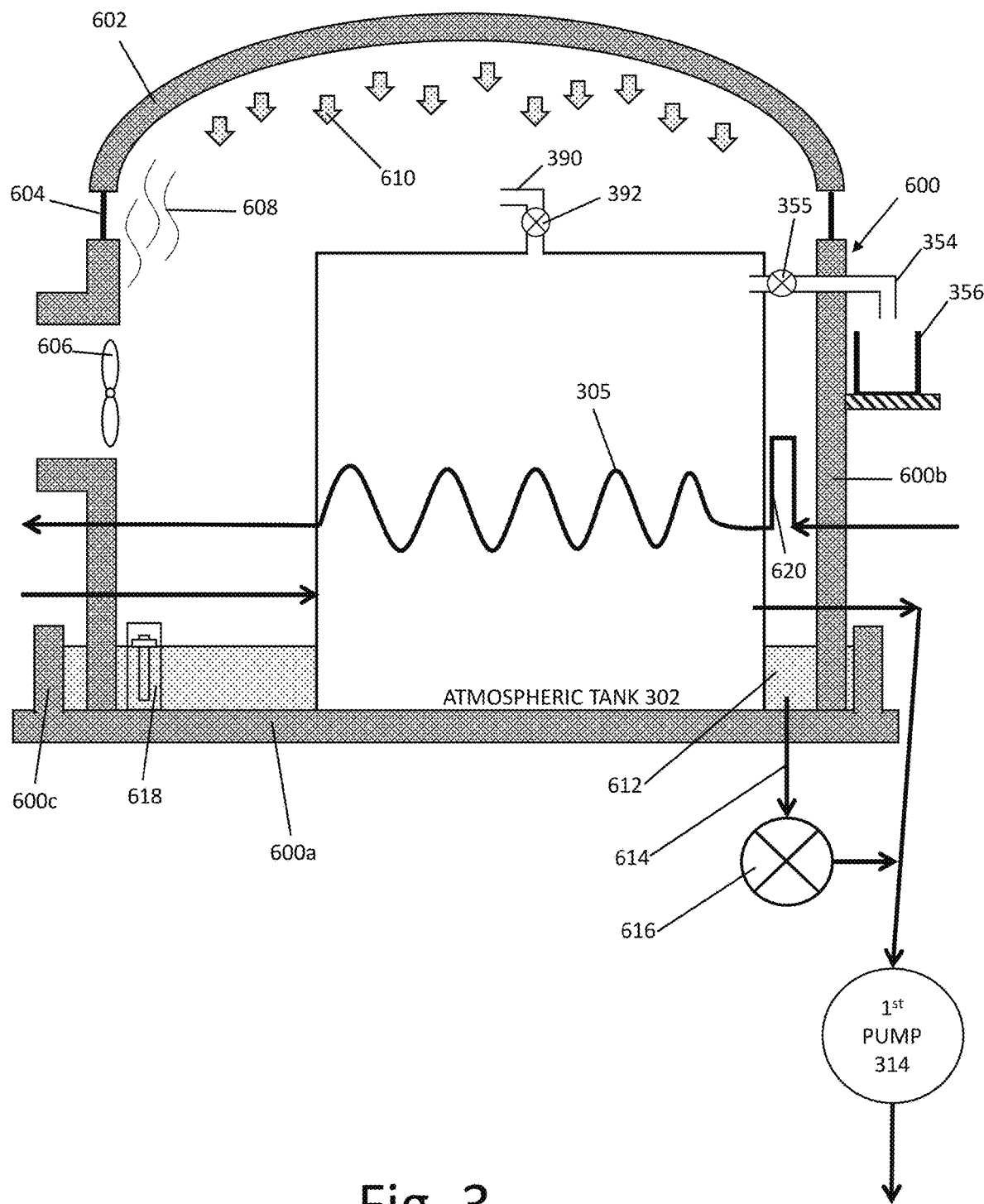
FIG. 3 is a block diagram illustrating an atmospheric tank of a water purification system of FIG. 1, which is surrounded by a fan shroud for cooling and for extracting water from air.

Any oil present in the atmospheric tank 302 rises to the top surface of the water inside the atmospheric tank 302 as the hydrophobic forces allow oil modules to come together separating the oil from water. As seen in the example of FIG. 3, the oil is removed by allowing the water surface to drain into an overflow tube 354 that is routed through a shut off valve 355 into a container 356. The container 356 can be drained when full.

In some embodiments of the present invention, the atmospheric tank 302 has a vent pipe 390 routed through a vent shut-off valve 392, as shown in FIG. 3. The vent pipe 390 is open to the outside air. The vent shut off valve 392 is opened to provide a drain/vent during the time water enters the atmospheric tank 302 from the vacuum tank 300, and to allow removing the oil residue inside the tank 302.

When the atmospheric tank 302 is full or a desired portion thereof has been filled, water from the atmospheric tank 302 is directed via a first water pump 314 to the clean water assembly 108, where more contaminants are removed and the acidity (pH) of the water is regulated. A fluoride filter 422 may be located upstream or downstream of the third pump 314, to remove contaminants from the water after leaving the atmospheric tank. The fluoride filter 422 is configured to remove Chlorine (99%), Lead (99%), Chromium 6, tastes and odors, heavy metals and 99.99% of other contaminants, while leaving essential minerals, unlike reverse osmosis systems which produce "dead water". The clean water assembly 108 includes a manifold 400, one or more ion exchange tanks (for example a first ion exchange tank 402 and a second ion exchange tank 404) a carbon tank 406, a cation tank 408, an anion tank 410, a second filter 412, a clean tank 413, a second pump 414, a third pump 416, a second valve 418, and a third valve 420. Optionally, the clean water assembly also includes an initial filter 424 and an ultraviolet (UV) filter treatment device 426. The initial filter 424 is optionally a removable spin down sediment water filter includes a 50 micron filter and is used to inspect the water through the container and as a back-up safety filter before going in the UV treatment device 426 where the water is sterilized down to 150 nanometers, to remove water-born microorganism including algae, fungi, bacteria, rickettsia and viruses providing clear and clean water.

The secondary heating element 360 and the temperature (thermocouple) sensor/probe 361 may be powered by direct current (DC) or alternating current (AC). The heating element secondary 360 may be a resistive heating element, generating heat due to resistance offered to electrical current passing there though.

Both the vacuum tank 300 and the atmospheric tank 302 have respective (dual float) level indicators 370 and 372 configured to measure the water level inside the respective tanks. The indicators 370 and 372 may be dual level float instruments with output panel meters (which may be digital, for example), that are designed notify the operator when the tanks are full of water or require additional water. The notification may be for example, via lights that may turn on or off, depending on the water level. As noted above, the vacuum tank 300 includes a temperature probe 361 configured to measure the temperature of water in the vacuum tank 300 and display the measured temperature, for example via a digital readout panel. Similarly, the atmospheric tank 302 may have a temperature probe 380 c0onfigured to measure the temperature of water in the atmospheric tank 302 and display the measured temperature, for example via a digital readout panel.

After a period of cycles, the brine tank 304 is filled. The top valve 308 leading to the brine tank 304 is closed and bottom valve 310 leading out of the brine tank is opened to allow the brine to be discharged into the waste tray 306 located below the brine tank. The waste tray 306 may be removed. The waste tray is open to the outside environment, enabling the brine to be dried, leaving valuable by-product, such as sodium chloride and/or other contaminants. The dry waste product can be packaged and delivered to other facilities. If the dry waste product includes sodium chloride, any unneeded material may be removed from the sodium chloride in other facilities.

In the atmospheric tank 302, the steam (water vapor and oil vapor, if present) received from the vacuum tank 300 condenses to liquid form. The condensation occurs due to the cooling of the vapor and increase in air pressure inside the atmospheric tank 302. The cooling occurs by the heat exchange between the liquid/vapor in the atmospheric tank 302 and the colder water piped from the contaminated water source passing through the heat exchange pipe 305 in the atmospheric tank 302. The air pressure increase occurs as pressure is lowered in the vacuum tank 300, while air pressure is maintained at atmospheric pressure in the atmospheric tank 302. The cooling may be necessary to compensate for heat building up at the high-yield vacuum pump 312. As noted above, the atmospheric tank 302 may include a temperature probe 380 and a level indicator 372 that may be connected to wall mounted panels providing indicators and digital readout for water level and temperatures in the atmospheric tank 302.

Any oil present in the atmospheric tank 302 rises to the top surface of the water inside the atmospheric tank 302 as the hydrophobic forces allow oil modules to come together separating the oil from water. As seen in the example of FIG. 3, the oil is removed by allowing the water surface to drain into an overflow tube 354 that is routed through a shut off valve 355 into a container 356. The container 356 can be drained when full.

In some embodiments of the present invention, the atmospheric tank 302 has a vent pipe 390 routed through a vent shut-off valve 392, as shown in FIG. 3. The vent pipe 390 is open to the outside air. The vent shut off valve 392 is opened to provide a drain/vent during the time water enters the atmospheric tank 302 from the vacuum tank 300, and to allow removing the oil residue inside the tank 302.

When the atmospheric tank 302 is full or a desired portion thereof has been filled, water from the atmospheric tank 302 is directed via a first water pump 314 to the clean water assembly 108, where more contaminants are removed and the acidity (pH) of the water is regulated. A fluoride filter 422 may be located upstream or downstream of the third pump 314, to remove contaminants from the water after leaving the atmospheric tank. The fluoride filter 422 is configured to remove Chlorine (99%), Lead (99%), Chromium 6, tastes and odors, heavy metals and 99.99% of other contaminants, while leaving essential minerals, unlike reverse osmosis systems which produce "dead water". The clean water assembly 108 includes a manifold 400, one or more ion exchange tanks (for example a first ion exchange tank 402 and a second ion exchange tank 404) a carbon tank 406, a cation tank 408, an anion tank 410, a second filter 412, a clean tank 413, a second pump 414, a third pump 416, a second valve 418, and a third valve 420. Optionally, the clean water assembly also includes an initial filter 424 and an ultraviolet (UV) Disinfection Sterilizer filter treatment device 426. The initial filter 424 is optionally a removable spin down sediment water filter includes a 50 micron filter and is used to inspect the water through the container and as a back-up safety filter before going in the UV treatment device 426 where the water is sterilized down to 150 nanometers, to remove water-born microorganism including algae, fungi, bacteria, rickettsia and viruses providing clear and clean water.

Water from the atmospheric tank 302 is directed by the first pump 314 to the initial filter 424, where particles larger than a desired size (e.g., 50 microns) are retained and prevented from going further. The UV treatment device 426 exposes the water to UV light to kill bacteria therein. Water then enters the manifold 400, which includes three exits: a first exit to the first ion exchange tank 402, a second exit to the cation tank 408, and a third exit to the anion tank 410. All three exits are closed by respective valves which can be opened in order to send the water to the desired tank.

Water coming from the vacuum assembly 106 is directed to the one or more ion exchange tanks (e.g., the first ion exchange tank 402 and the second ion exchange tank 404), then to the carbon tank 406, the second filter 412. The one or more ion exchange tanks and the carbon tank are configured for balancing the pH of the water. If the ion exchange tank and the carbon tank are not enough to yield water having a desired pH within a desired range of pH 7 (e.g. 6.5 to 7.5, 6.7 to 7.3, 6.9 to 7.1, etc.), the cation and anion tanks are needed, as explained further below. The second filter 412 may include a carbon filter. Carbon particles from the carbon tank 406 which may be larger than a desired size (e.g., 10 microns) are retained by the second filter 412. Water exiting the second filter 412 is collected by the clean tank 413. When the clean tank 413 is full, the first pump 314 is turned off and the water in the clean tank 413 is tested. If the test results are not satisfactory the clean water can be pumped into one of two different directions. Unsatisfactory test results may indicate unsafe levels in pH, coliform count, turbidity, color, and other chemical parameters. The tests may be performed in situ or in a separate testing facility.

If the tests deem the water in the clean tank 413 to be satisfactory for drinking, then the second pump 414 is turned on to pump the water from the clean tank 413 to the storage tank 110 (which may be part of the system 100 or may be joined to the system 100).

If the unsatisfactory result of the test is the unsafe pH level of the water, then the third pump 416 is activated, the third valve 420 is closed, and the second valve 418 is opened to direct the water back via a first return line 2 to the manifold 400, in which the appropriate valve is opened to direct the water to the cation tank 408 or the anion tank 410. If the water is too acidic (e.g., pH lower than 7 or lower than 6.5), then the water is sent to the anion tank 410, where excess $H^+$ ions in the water combine with $OH^-$ ions in the anion tank, thereby reducing acidity. If the water is too basic (e.g., pH greater than 7, greater than 7.5, or greater than 8), then the water is sent to the cation tank 408, where excess $OH^-$ ions in the water combine with $H^+$ ions in the cation tank, thereby reducing basicity. Water from the cation tank or anion tank is sent back to the clean tank 413. Optionally, the water is directed from the clean tank 413 to the manifold 400 via the preliminary filter 424, and the UV treatment device 426.

If the unsatisfactory result of the test is the presence of non-soluble particles and/or the presence of certain bacteria, then the manifold 400 is operated to direct the water from the clean tank 413 once more to the ion exchange tanks 402 and 404, the carbon tank 406, and the second filter 412, and back to the clean tank 413.

If the unsatisfactory result of the test is the presence of solutes in the water (such as salts or other soluble contaminants), then the third pump 416 is turned on, the first valve 418 is closed, and the second valve 420 is opened to direct the water back to the vacuum tank 300 via a second return line 3. In some embodiments of the present invention, the water is directed to the vacuum tank 300 via the water line from the solar collector 104 to the vacuum tank 300. In such an embodiment, the valve 706 is located along the water line leading from the solar collector 104 to the vacuum tank 300 upstream of the point of entry of the water into the water line leading from the solar water collector 104 to the vacuum tank 300. The valve 706 is configured to prevent water for the clean tank from entering the solar water collector 104. After reentering the vacuum tank 300, the water recirculates back though the system, as explained above.

Optionally, a vacuum gauge 352 is configured to measure the vacuum pressure in the vacuum tank. A similar device could be used to transmit the measurements to a control device, so that the control device can operate the high-yield vacuum pump(s) 312 and the low-yield vacuum pump 313 as needed, in order to reach desired vacuum pressure. In some embodiments of the present invention, the vacuum gauge 352 is a NAVAC NMV1 Digital Micron Vacuum Gauge, which reads in Pa, mbars, mmHg and microns, and is configured to transmit pressure measurements to a control unit.

In some embodiments of the present invention, one or more water flow meters 699 may be installed in system 100 and connected to a recording device (i.e., chart recorder, electronic recorder, or computer) to monitor the amount of water used in the system. The flow meter may be installed anywhere in the system, for example along the water line between the second pump 414 and the storage tank 110, or downstream of the first pump 314. This can be a viable method to determine the level of usage of the system 100, which can be an indication of when to replace the cation, anion, ion exchange tanks, carbon tank, and to replace the fluoride filters and the 10 micron filter elements, the lifetime of which depends on water than has flowed therethrough.

The system 100 is electrically efficient. This is because not all of the assemblies (106, and 108) operate at the same time. To make an efficient system the different components are operated on-demand, only when required.

Figure 2:
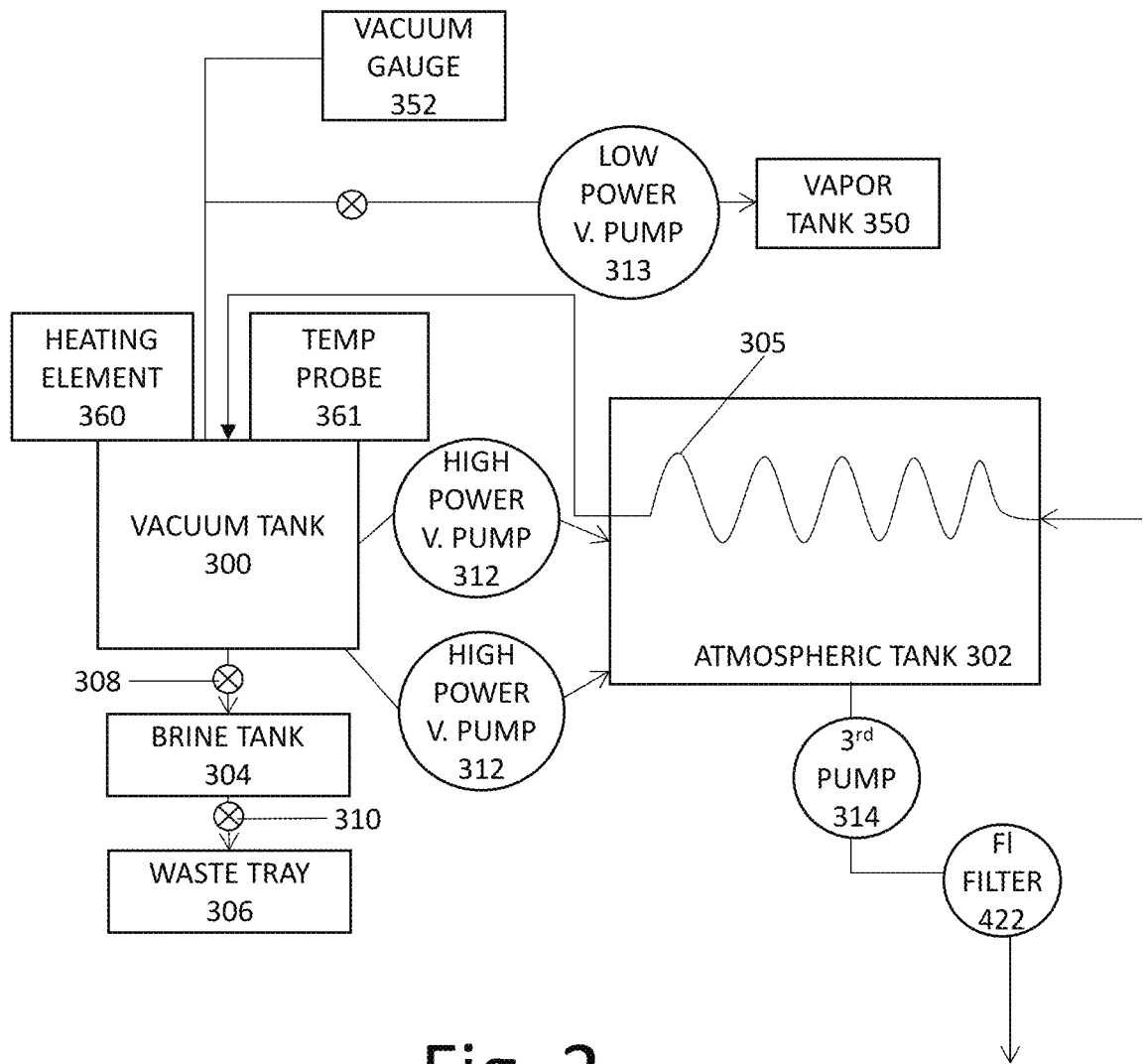
FIG. 2 is a block diagram illustrating a vacuum assembly of a water purification system of FIG. 1, which includes a plurality of high-yield vacuum pumps in parallel with each other.

The quantity of potable water produced by the system 100 can be increased by providing more than one high-yield vacuum pump 312 in the vacuum assembly. This is because, a single Leybold CP-150 CLAWVAV pump is configured to pump (1.5±0.25) gallons of water per hour or 12.5 pounds of water per hour and is the slowest of the pumps of the system 100. Therefore, providing more high-yield vacuum pumps 312 would increase the daily production of potable water by the system 100. The example of FIG. 2 illustrates a vacuum assembly 106 which includes a plurality of high-yield vacuum pumps 312 in parallel with each other, each of the high-yield vacuum pump being configured to pump the vapor from the vacuum tank 300 to the atmospheric tank 302.

In some embodiments of the present invention, the vacuum assembly 106 includes a flow control valve 200 followed by the ball valve 208 in the water line leading from the atmospheric tank to 302 to the vacuum tank 300. A further filter (e.g., a 10-micron filter) may follow the flow control valve 200. The flow control valve is configured for controlling the rate of water flow from the atmospheric tank 302 to the vacuum tank 300. Setting the flow control valve needs to be adjusted prior to operating the system. The flow control valve 200 is adjusted for providing a predetermined flow of raw water into the vacuum tank (300). By turning a knob on the flow control valve 200, the flow can be adjusted to the recommended value of 9.8 ounces per minute. The ball valve 208 is connected between the vacuum tank and the flow control valve 200 in order to get the correct flow. The ball valve 208 may be closed when the flow control valve is adjusted, and reopened when the adjustment has occurred. The system converts hot vapor into approximately 1½ gallons of water per hour based on a pumping speed of 150 to 180 m³/hr. In order to adjust the flow control valve to the needed flow rate, you need to do the flowing math: 231 in³/gal×1.5 gallons/hr. divided by 60 seconds equal 5.77 in³/min, which equals 9.982 oz/min of water.

In some embodiments of the present invention, piping lines going to the high-yield pump 312 and exhausting from the high-yield vacuum pump 312 are not insulated because the majority of plumbing is PVC Tubing and has a low thermal conductivity and will retain the heat until the hot vapor is discharged into the atmospheric tank. Piping lines going from the atmospheric tank to the vacuum tank are may also be insulated with Styrofoam or a suitable material to retain heat.

In some embodiments of the present invention, a second water line leaves the heat exchange pipe 305 and leads source water to the brine tank 304. A fourth valve 209 is located along this line in order to selectively allow and deny passage of water therethrough. The brine tank also includes an exit line having an exit valve 309. When the brine tank needs to be washed, the fourth valve 209 is open, and the exit valve 309 is open. Thus, source water can be used to wash the brine tank. During the washing of the brine tank, the top valve 308 may be closed to allow normal operation of the vacuum tank 300.

In some embodiments of the present invention, the vacuum tank 300, the atmospheric tank 302, the clean tank 413, and the water storage tank 110 include respective level control units which measure the water levels in the respective tanks. In a first variant, a central control unit receives data from all level control units and from the temperature (thermocouple) sensor/probes 361 and 380 and the dual float level indicators 370 and 372 to activate the different pumps and open/close valves as needed, according to operation instructions. In a further variant, called Manual Control, there is no central control unit. Each water level indicator displays water level near the respective tank, the temperature probe 361 displays the water temperature in the vacuum tank 300, and the vacuum gauge 352 displays the pressure in the in the vacuum tank 300. The operation of each of the pumps requires the user to turn on the pump, the operation of each valve requires the user to manually open or close the valve, and the operation of the heating element 360 and/or solar water pump requires the user to switch the heating element on manually.

In some embodiments of the present invention, as illustrated by FIG. 3, the vacuum assembly includes a shroud 600 surrounding the atmospheric tank 302. The shroud has a floor 600a supporting the atmospheric tank 302 and a wall 600b surrounding the atmospheric tank 302. A dome 602 (which may be hemispherical, for example) is placed on top of the shroud and is supported above the wall of the shroud 600 by support elements 604, such that an opening is present between the wall 600b and the dome 602. The wall 600b has an opening covered by a fan 606 (rotating fan, or any other type of fan). The fan is configured to direct air from outside the shroud 600 into the shroud 600 and contact the outer wall of the atmospheric tank 302. In a non-limiting example, air is driven by the fan 606 at a flow rate of about 20 standard cubic feet per minute (scfm) and is compressed to a pressure of about 80 pounds per square inch (psi). As the compressed air comes into contact with the warmer walls of the atmospheric tank 302, the atmospheric tank is cooled. Moreover, some of the moisture in the compressed air evaporates (vapor lines 608) and rises toward the dome 602. The vapor condenses on inside of the dome and drips to the floor 600a supporting the atmospheric tank 302 (downward arrows 610). The floor has a skirt 600c which rises from the floor 600a and surrounds the atmospheric tank, so that the dripped water 612 collects on the floor 600a and accumulates between the skirt 600c and the atmospheric tank 300. In some embodiments of the present invention, the skirt 600c integral with the wall 600b. A water line 614 connected to the first water pump 314 and regulated by a valve 616 is configured to direct the collected water 612 via the first water pump 314 to the clean water assembly 108. In some embodiments of the present invention, a water level indicator 618 is located in the shroud to detect the level of the collected water 612. When the level of the collected water 612 is above a predetermined level, the valve 616 is opened to allow the first pump to direct the collected water to the clean water assembly. In this manner, the high temperature of water and vapor in the atmospheric tank can be used to extract water from the air surrounding the atmospheric tank and lead the extracted water to the clean water assembly for filtering and purification.

Figure 10:
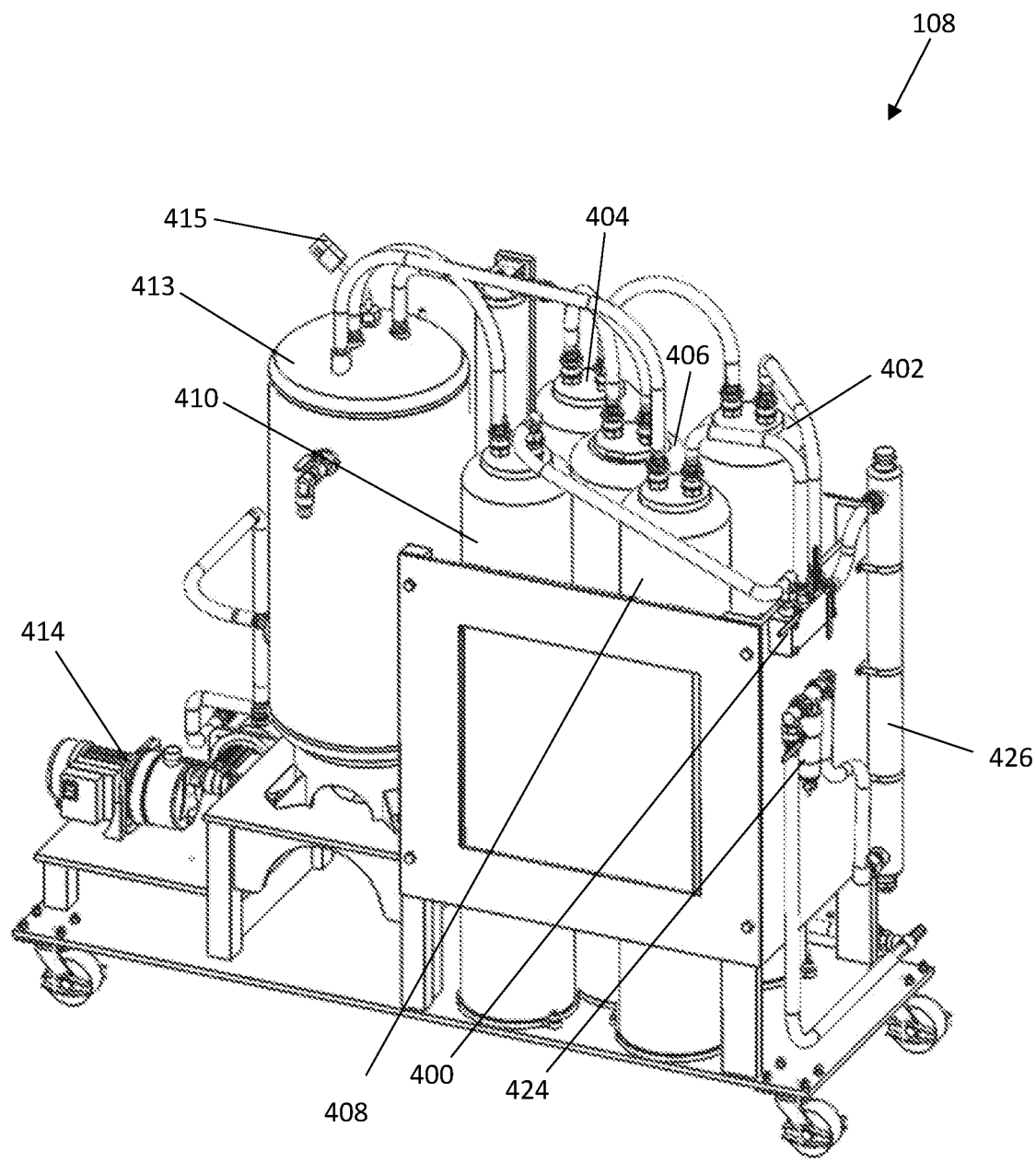
FIG. 10 is a perspective view of an example of the clean water assembly of the water purification system of FIG. 1, according to some embodiments of the present invention.
Figure 12:
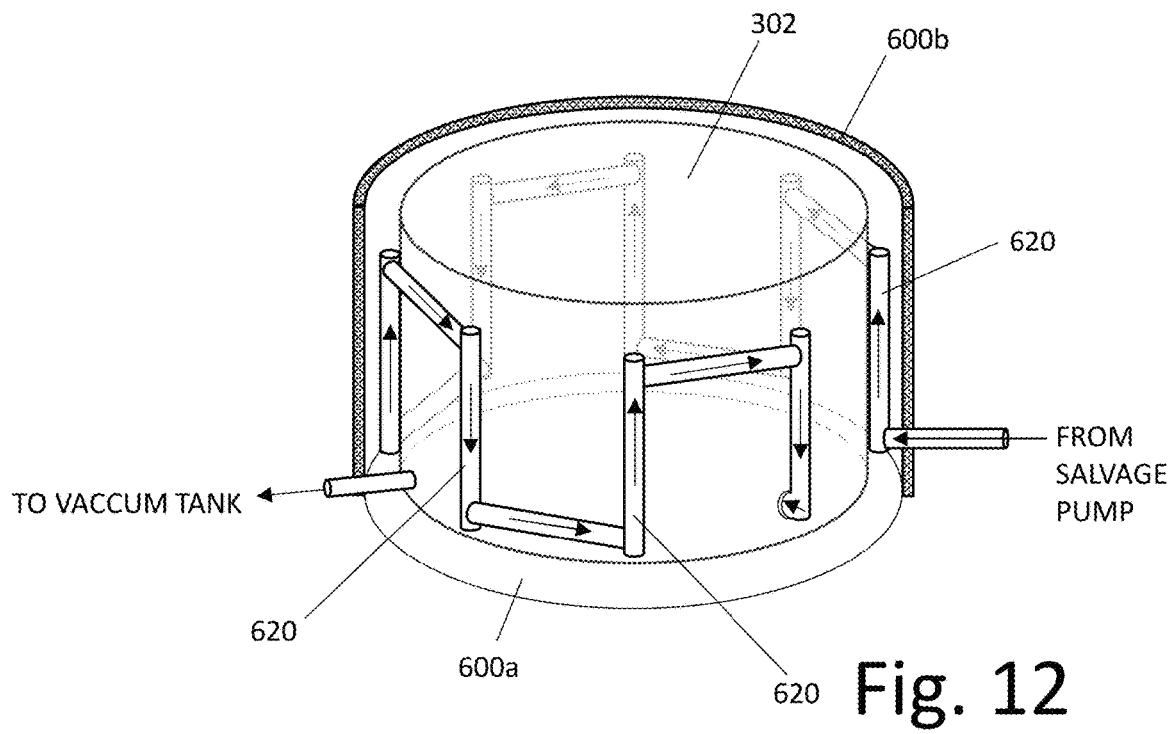
FIG. 12 is a cutout drawing illustrating a skirting pipe surrounding the atmospheric tank inside the shroud, according to some embodiments of the present invention.
Figure 13:
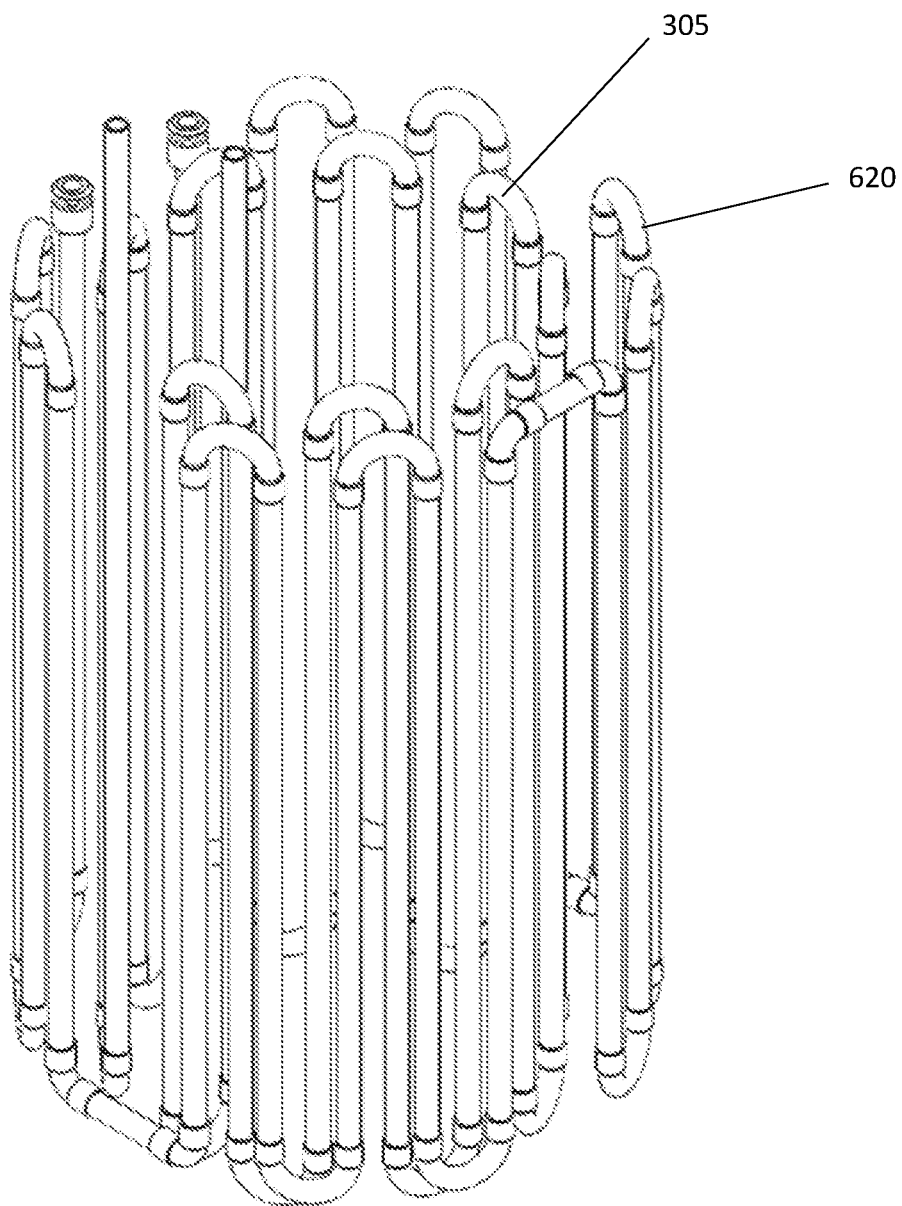
FIG. 13 illustrates a single piece of piping forming the skirting pipe and the heat exchange pipe.

As illustrated in the example of FIG. 12, in some embodiments of the present invention, the vacuum assembly includes an outer system configured use the source water in order to cool the atmospheric tank 302 before the source water enters the heat exchange pipe 305 in the atmospheric tank 302. The cooling system includes a skirting tube 620 which skirts around the atmospheric tank 302 and is joined to the outer wall of the atmospheric tank 302. In FIG. 10, the atmospheric tank 302 is displayed as partially transparent in order to show how the skirting pipe 620 leads the source water around and along the outer wall of the atmospheric tank. In the non-limiting example of FIG. 13, it can be seen that a single serpentine pipe can be used to form the skirting pipe 602 and the heat exchange pipe 305. The single, continuous serpentine pipe has an outer skirting (that corresponds to the skirting pipe 620) an inner skirting (that corresponds to the heat exchange pipe 305). The outer skirting is located outside the atmospheric tank 302, and surrounds and is connected to the inner skirting (that corresponds to the heat exchange pipe 305).

The source water inside the skirting tube 620 exchanges heat with the outer wall of the atmospheric tank 302, thereby cooling the atmospheric tank. At the same time, the source water inside the skirting tube 620 is cooled by the compressed air driven by the fan 606. In this manner, the compressed air driven by the fan is further used to cool the atmospheric tank 302. After having travelled through the skirting tube 620, the source water enters the atmospheric tank 302 and further cools the atmospheric tank 302 from inside by travelling inside the heat exchanger pipe 305, as explained above.

Figure 11:
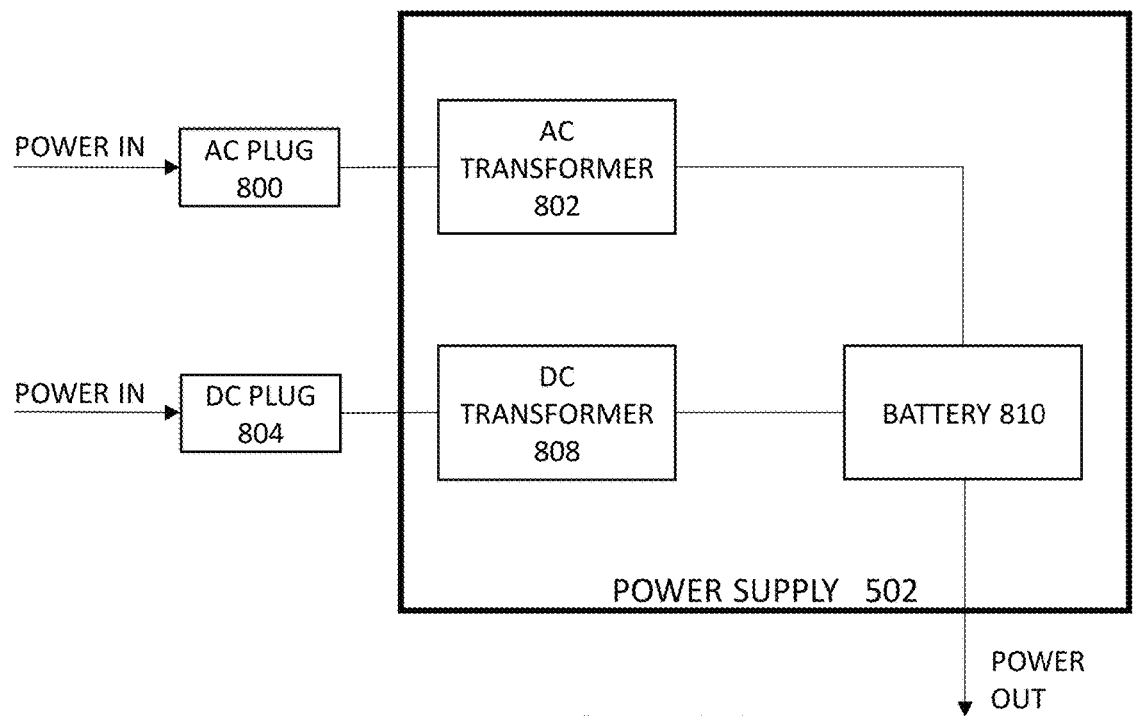
FIG. 11 is a block diagram illustrating a power supply of the water purification system of FIG. 1, according to some embodiments of the present invention.

In some embodiments of the present invention, the power supply 502 of the system 100 is configured according to the block diagram of FIG. 11.

In the example of FIG. 11, the power supply 502 includes an AC plug 800, an AC transformer 802, a DC plug 804, a DC transformer 808, and a battery array 810. The power supply 502 is configure for supplying electrical power to the different elements (e.g., water pumps, vacuum pumps, heating elements 8, temperature probes, central control unit) that need electrical power to operate.

The AC plug 800 is configured to be plugged into and receive power from an AC power source, such as the electrical grid. AC power flows to the AC transformer 802, which converts the AC power to power usable to charge the battery array 810. Similarly, the DC plug 804 is configured to be plugged into and receive power from a DC power source, such as a generator or photovoltaic electrical generators. DC power flows to the DC transformer 808, which converts the AC power to power usable to charge the battery array 810.

The battery array 810 includes one or more rechargeable batteries that are configured for releasing electrical power to the various units of the water purification system 100.

To reduce the amount of purchased electrical power one can take advantage of using existing solar panels, wind power turbines, solar hot water collector and portable electric generators. The electrical apparatus of the system 100 can connect to the local electrical grid during low demand times. The batteries may be charged when the electrical apparatus of the system 100 is connected to the local electrical grid, or receiving power from solar panels, wind power turbines, solar hot water collector and portable electric generators.

In order to further reduce the power consumption of the system 100, the water flow rate may be kept low and the size of the different tanks is designed so that the effective height through which the flow is to be pumped is only approximately five feet. In addition, power consumption is affected by the distance the water is traveling inside the hoses or pipes and friction inside the pipe or the hoses piped and pipe friction. Therefore, the length of the piping or hoses is minimized, and the pipes or hoses are made of a low friction material, such as plastic. Pumps are usually 50-85% efficient, electric pump motors such as the 5 HP CP-150 CLAWVAC pump electric motor and the 1.6 HP water pump electric motors are usually 80-95% efficient. The 5 hp electric motor (312) requires a VFD Vertical Frequency Drive that connects to the wall outlet and the electric Claw vacuum motor. The operating features can be controlled with this electronic hardware.

The inventors have estimated that about 7.5 kW are needed to power the system 100 of the present invention. Therefore, a portable 10 kW generator readily available in the market can be used to power the system 700 of the present invention.

Figure 14:
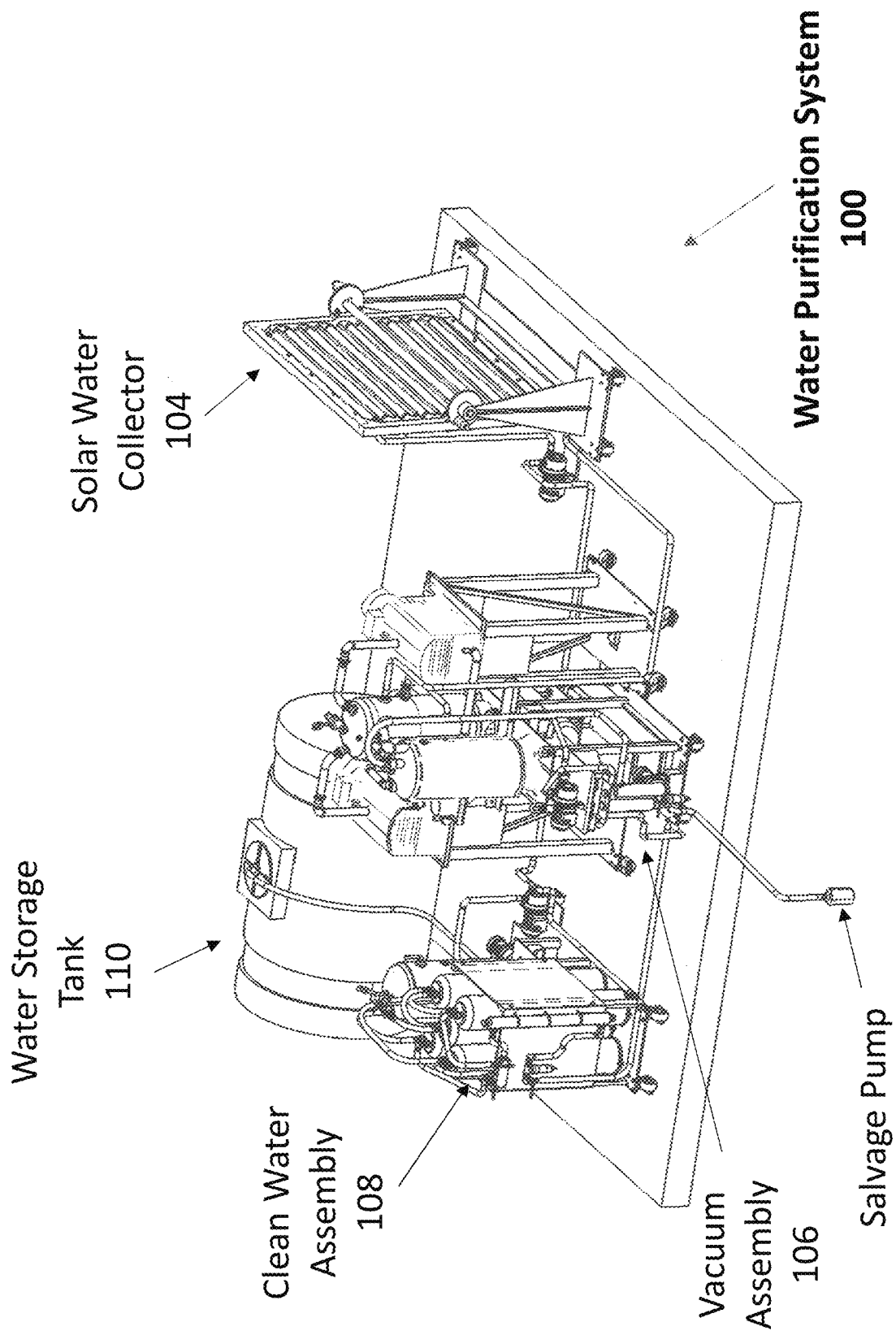
FIG. 14 is an isometric drawing of a water purification system, according to some embodiments of the present invention.

Another advantage of the water purification system 100 is portability, as shown in FIG. 14. For reference, "Basic Science Concepts and Applications" by American Water Works Association (see page 155 for Mathematics Per Capita Water Use, page 155 for Domestic Water Use Based on Household Fixture Rate, page 167 for Average Daily Flow) estimates that a four-person family generally uses 366.85 gallons of water per day (gpd). In some embodiments of the present invention, the vacuum tank assembly footprint is approximately 6 feet wide by 7 feet long and 8 feet tall. The Clean Tank Assembly is approximately 3 feet×6 feet long and 7 feet tall. This area includes the solar hot water collector 104 of FIG. 15 and the clean water storage tank 110, which may be variable in size. In some embodiments of the present invention, the inventors have concluded that the system 700 described above and having an approximate footprint of 12 feet wide by 7 feet long by 8 feet tall can be used to purify about 30 to 36 gallons per day. The quantity of potable water can be increased by providing more vacuum pumps to the vacuum assembly or by using additional water purification systems 100. This is because, a single CP-150 CLAWVAC pump (a mid-ranged vacuum pump) pumps 12.5 pounds of water per hour or 15 to 18 gallons per hour and is slower than the other pumps (112, 314, 414, 416, 704) in the system 100. Therefore, providing more high-yield vacuum pumps or larger models such as the CP-300 CLAWVAC pump would increase for a single pump up to 60 to 72 gallons per day or 120 to 144 gallons using dual pumps and the daily production of potable water by the system 100. The example of FIG. 2 illustrates a vacuum assembly 106 which includes a plurality of high-yield vacuum pumps 312 in parallel with each other, configured for pump the vapor from the vacuum tank 300 to the atmospheric tank 302.

In some embodiments of the present invention, the system 100 is compact enough to be placed in the bed of a pickup truck and a small 14 foot trailer. In a non-limiting example, the vacuum tank 300, the atmospheric tank 312, and the clean tank 413 are 30-gallon tanks. The brine tank 304 is 10-gallon tanks. The ion exchange tanks 402 and 404, the carbon tank 406, the cation tank 408, the anion tank 410 are 10-gallon tanks. The tanks may, for example be steel ASTM A-36 tanks which are pressure tested to 200 psi and treated with rust preventive paint. The tanks may be made of any suitable material, such as stainless steel or titanium, for example. The inventors have found that scaling down the system 100 in size would generate less water but still require the same amount of power to operate. In some embodiments of the present invention, each of the tanks have float level instruments located on top of the tank. When the water level float descends to the preset position the instruments electrical contact turns on the electric water pump. When the water level rises to the preset position the instruments electrical contact turns off the electric water pump. The electrical water pumps have an on/off manual switch which allows manual override of control when the system 100 is controlled by a central control unit having a Central Processing Unit or a PLC.

The system 100 can be operated manually or may be operated via an automatic control device. If the system 100 is to be operated manually, the valves in the manifold 400 and the valves 418 and 420 may be manually operated valves, such as ball valves.

If the system 100 is operated by an automatic control device (e.g., a computer), electrical solenoid operated ball valves are used. An example of a solenoid operated ball valve is the ¾" NPT Solenoid valve 120/60 110/50¾" Orifice, which may be purchased on Amazon. As mentioned above, the operation of the pumps may be dictated by water level control units (e.g., float level indicators) included in all the vertical tanks.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A water purification system comprising:
   i. a salvage pump, configured to draw water from a water source;
   ii. a vacuum assembly, comprising:
      a vacuum tank, configured to receive water from the salvage pump;
      a vacuum pump assembly, configured to lower pressure inside the vacuum tank to cause evaporation of water stored in the vacuum tank, and to draw water vapor from the vacuum tank;
      an atmospheric tank, configured to be maintained at an atmospheric pressure and to receive the water vapor drawn by the vacuum pump assembly from the vacuum tank, the atmospheric tank being configured to transform water vapor received from the vacuum pump into liquid water;
      a heat exchanger pipe traversing the atmospheric water tank and configured to lead water from the salvage pump to the vacuum tank without contacting the water and water vapor in the atmospheric tank, thereby warming the water in the heat exchanger pipe while cooling the water and water vapor inside the atmospheric tank; and
      a first pump, configured to draw water out of the atmospheric tank;
   iii. a clean water assembly, comprising:
      a plurality of filters, configured to filter water drawn by the first pump;
      a clean tank, configured to receive water that has been filtered by the plurality of filters;
      a second pump, configured for drawing water from the clean tank to a water storage tank; and
      a third pump, configured for drawing water from the clean tank and leading the water drawn from the clean tank into a further purification cycle.

2. The water purification system of claim 1, wherein the vacuum pump assembly comprises:
   a low-yield vacuum pump, configured to lower pressure inside the vacuum tank to a first predetermined pressure and configured to have an exhaust outside the atmospheric tank; and
   at least one high-yield vacuum pump, configured to be activated after the low-yield vacuum tank, and configured to lower pressure inside the vacuum tank from the first predetermined pressure to a second predetermined pressure lower than the first predetermined pressure, the at least one high-yield pump exhausting into the atmospheric tank;
   wherein an operation of the at least one high-yield vacuum pump after the low-yield vacuum has brought pressure inside the vacuum tank to the predetermined first pressure is configured to diminish an occurrence of liquid water being pumped from the vacuum tank to the atmospheric tank by the high-yield vacuum pump.

3. The water purification system of claim 2, wherein the first predetermined pressure is at or above 982 mbars, and the second predetermined pressure is about 939.7 mbars.

4. The water purification system of claim 1, further comprising a solar pump and a solar water collector, wherein:
   the solar pump is configured to drive water from an outlet of vacuum tank to an inlet of the solar collector, via the solar collector, via an outlet of the solar collector, and back into the vacuum tank via an inlet of the vacuum tank; and
   the solar collector is configured for using solar power to heat water flowing in the solar collector.

5. The water purification system of claim 1, wherein:
   the vacuum assembly comprises a brine tank located under the vacuum tank and communicating with the vacuum tank via a first water line opened and closed via a top valve;
   top valve is configured to be opened, to cause the brine collected at a bottom of the vacuum tank to enter the brine tank.

6. The water purification system of claim 5, wherein the vacuum assembly comprises a waste tray located under an outlet of the brine tank;
   the outlet of the brine tank is configured to be opened and closed via a bottom valve;
   the bottom valve is configured to be opened, to cause the brine collected in the brine tank to enter the waste tray.

7. The water purification system of claim 6, wherein the waste tray is removable from under the outlet of the brine tank.

8. The water purification system of claim 1, further comprising a fluoride water filter located downstream of the first pump.

9. The water purification system of claim 1, wherein the clean water assembly comprises a manifold, at least one ion exchange tank, a carbon tank, a cation tank, and an anion tank, wherein:
   the manifold comprises an inlet for receiving water from the first pump, a first exit line, a second exit line, and a third exit line, each exit line being openable and closable by a respective valve;
   the first exit line leads to the least one ion exchange tank;
   the at least one ion exchange tank has an outlet leading to the carbon tank, which has a first outlet leading to the clean tank;
   the second exit line leads to the cation tank, which has a second outlet leading to the clean tank;
   the third exit line leads to the anion tank, which has a third outlet leading to the clean tank;
   the at least one ion exchange tank and the carbon tank are configured to balance the pH of water flowing therethrough;
   the cation tank contains $H^+$ ions, and is configured to decrease a basicity of water flowing therethrough by neutralizing excess $OH^-$ ions in the water with the $H^+$ ions in the cation tank; and
   the anion tank contains $OH^-$ ions, and is configured to decrease an acidity of water flowing therethrough by neutralizing excess $H^+$ ions in the water with the $OH^-$ ions in the anion tank.

10. The water purification system of claim 9, comprising an initial filter located upstream of the manifold and configured for retaining particles larger than a first predetermined size.

11. The water purification system of claim 9, comprising a second filter located between the carbon tank and the clean tank, and configured for retaining particles larger than a second predetermined size.

12. The water purification system of claim 9, comprising an ultra violet (UV) treatment device located upstream of the manifold and configured to expose water to UV light to kill bacteria in the water.

13. The water purification system of claim 1, wherein:
the third pump is configured to draw water from the clean tank and deliver the water to a first return water line and to a second return water line;
the first return water line leads water drawn by the third pump back to the plurality of filters;
the second return water line leads water drawn by the third pump back to the vacuum tank;
a first return valve is located along the first return water line to enable the first return water line to be opened and closed; and
a second return valve is located along the second return water line to enable the second return water line to be opened and closed.

14. The water purification system of claim 1, further comprising a water flow meter installed along any water line of the system to monitor an amount of water used in the system.

15. The water purification system of claim 1, wherein:
the vacuum tank comprises a first temperature gauge and a heating element; and
the first temperature gauge is configured to measure temperature of the water in the vacuum tank and for activating the heating element so as to maintain the water in the hot water tank above a desired temperature or within a desired range of temperatures.

16. The water purification system of claim 2, wherein the at least one high-yield vacuum pump comprises a plurality of high-yield vacuum pumps in parallel with each other.

17. The water purification system of claim 1, further comprising:
a shroud, having a wall surrounding the atmospheric tank, the wall having an opening; and
a fan, configured to direct air from outside the shroud into the shroud, to contact an external wall of the atmospheric tank to cool the atmospheric tank.

18. The water purification system of claim 17, further comprising:
a skirting tube which skirts around the outer wall of the atmospheric tank, the skirting tube receiving the source water from the salvage pump and directing the water into the heat exchange pipe;
such that the source water inside the skirting tube exchanges heat with the outer wall of the atmospheric tank, and the source water inside the skirting tube is cooled by the air driven by the fan.

19. The water purification system of claim 17, comprising:
a dome located above the shroud wall; and
a shroud floor configured to support the atmospheric tank, and having a skirt extending upwards from the shroud floor and surrounding the atmospheric tank;
wherein some of the moisture in the air directed by the fan evaporates into water vapor upon contacting the outer wall of the atmospheric tank, and the dome is configured to cause the water vapor to condensate, drip as liquid water on the shroud floor, and collect on the shroud floor between the skirt and the atmospheric tank.

20. The water purification system of claim 19, comprising a water line connected to the first pump and configured to direct the liquid water collected on the shroud floor to the clean water assembly.

* * * * *